US012643390B2

(12) United States Patent
Rulfi Fertilio

(10) Patent No.: US 12,643,390 B2
(45) Date of Patent: Jun. 2, 2026

(54) MULTI-SPEED HYBRID TRANSMISSION AND TRANSMISSION OPERATING METHOD

(71) Applicant: DANA GRAZIANO S.R.L., Rivoli (IT)

(72) Inventor: Emanuele Rulfi Fertilio, Mondovì (IT)

(73) Assignee: DANA PERFORMANCE TRANSMISSIONS S.R.L., Luserna San Giovanni (IT)

( * ) Notice: Subject to any disclaimer, the term of this patent is extended or adjusted under 35 U.S.C. 154(b) by 692 days.

(21) Appl. No.: 18/061,913

(22) Filed: Dec. 5, 2022

(65) Prior Publication Data

US 2023/0191897 A1     Jun. 22, 2023

Related U.S. Application Data

(60) Provisional application No. 63/265,685, filed on Dec. 17, 2021.

(51) Int. Cl.
B60K 6/547      (2007.10)
B60K 6/36      (2007.10)
B60K 6/48      (2007.10)

(52) U.S. Cl.
CPC ............... B60K 6/547 (2013.01); B60K 6/36 (2013.01); B60K 6/48 (2013.01); *B60K 2006/4825* (2013.01)

(58) Field of Classification Search
CPC . B60K 6/36; B60K 6/38; B60K 6/387; B60K 6/48; B60K 6/547
See application file for complete search history.

(56) References Cited

U.S. PATENT DOCUMENTS 8,931,371 B2 * 1/2015 Xie ........................... B60K 6/48
                                                903/909
9,186,978 B2 * 11/2015 Park ......................... B60K 6/48
(Continued)

FOREIGN PATENT DOCUMENTS

CN          112356654 A      2/2021
DE      202017102177 U1      6/2017
(Continued)

OTHER PUBLICATIONS

Joseph, N., "This Latest Zenvo TSR-S Could Be The Most Stunning Yet," CarBuzz Website, Available Online at https://carbuzz.com/news/this-latest-zenvo-tsr-s-could-be-the-most-stunning-yet, Mar. 12, 2020, 6 pages.
(Continued)

*Primary Examiner* — Jeffrey J Restifo
(74) *Attorney, Agent, or Firm* — McCoy Russell LLP

(57)          ABSTRACT

A hybrid transmission system with a multi-speed gearbox. The multi-speed gearbox, in one example, includes a first primary shaft with a first set of gears positioned thereon and selectively coupled to an internal combustion engine (ICE) at a first end and a second primary shaft with a second set of gears positioned thereon. The gearbox further includes a secondary shaft with a third set of gears that mesh with the first set of gear and the second set of gears and an electric drive interface gear that is idly mounted, free to spin, on the second primary shaft, positioned between two gears in the second set of gears, and configured to receive mechanical power from an electric machine and an output shaft that is configured to mechanically attached to a differential.

10 Claims, 20 Drawing Sheets

(56) References Cited

U.S. PATENT DOCUMENTS

| | | | | |
|---|---|---|---|---|
| 9,358,873 | B2 * | 6/2016 | Moore | B60K 6/547 |
| 9,618,085 | B2 * | 4/2017 | Dzafic | B60K 6/547 |
| 9,764,630 | B2 * | 9/2017 | Kaltenbach | B60W 10/08 |
| 9,849,771 | B2 * | 12/2017 | Zhang | F16H 3/085 |
| 10,166,853 | B2 * | 1/2019 | Yang | B60K 6/448 |
| 10,166,973 | B2 * | 1/2019 | Yang | B60W 20/30 |
| 10,252,608 | B2 * | 4/2019 | Liu | B60K 6/26 |
| 10,300,782 | B2 * | 5/2019 | Cho | F16H 3/54 |
| 10,391,851 | B2 * | 8/2019 | Ruan | B60K 6/48 |
| 10,434,862 | B2 * | 10/2019 | Hwang | F16H 37/046 |
| 10,495,199 | B2 * | 12/2019 | Cho | F16H 3/54 |
| 10,604,001 | B2 * | 3/2020 | Cho | B60K 6/48 |
| 10,668,918 | B2 * | 6/2020 | Iwashita | F16H 61/12 |
| 10,718,415 | B2 * | 7/2020 | Park | F16H 3/006 |
| 10,753,432 | B2 * | 8/2020 | Hwang | B60K 6/387 |
| 10,814,714 | B2 * | 10/2020 | Hummel | B60K 6/547 |
| 10,864,814 | B2 * | 12/2020 | Hummel | F16H 3/093 |
| 10,883,574 | B2 * | 1/2021 | Hummel | F16H 3/093 |
| 10,899,219 | B2 * | 1/2021 | Lian | B60K 6/48 |
| 10,981,442 | B2 * | 4/2021 | Eo | B60K 6/547 |
| 11,052,750 | B2 * | 7/2021 | Hwang | B60K 6/36 |
| 11,084,370 | B1 * | 8/2021 | Park | B60K 6/387 |
| 11,117,459 | B2 * | 9/2021 | Hummel | B60K 6/547 |
| 11,209,073 | B2 * | 12/2021 | Park | B60K 6/365 |
| 11,305,632 | B2 * | 4/2022 | Hummel | B60K 6/48 |
| 11,325,455 | B2 * | 5/2022 | Park | B60K 6/24 |
| 11,331,997 | B1 * | 5/2022 | Kim | B60K 6/48 |
| 11,364,785 | B2 * | 6/2022 | Roske | F16D 21/00 |
| 11,420,513 | B2 * | 8/2022 | Hummel | B60K 6/547 |
| 11,525,499 | B2 * | 12/2022 | Stöckl | F16H 37/10 |
| 11,850,944 | B2 * | 12/2023 | Duan | B60K 6/48 |
| 12,012,005 | B1 * | 6/2024 | Li | B60W 20/20 |
| 12,024,019 | B2 * | 7/2024 | Rulfi Fertilio | B60K 6/387 |
| 12,097,766 | B2 * | 9/2024 | Gitt | B60K 6/48 |
| 12,365,235 | B2 * | 7/2025 | Rulfi Fertilio | B60K 6/48 |
| 12,385,556 | B2 * | 8/2025 | Lang | F16H 37/084 |
| 12,403,759 | B2 * | 9/2025 | Sagmeister | B60K 6/442 |
| 2019/0168600 | A1 * | 6/2019 | Lian | B60K 17/08 |
| 2019/0225068 | A1 * | 7/2019 | Liu | F16H 3/006 |
| 2019/0315220 | A1 * | 10/2019 | Liu | B60K 6/547 |
| 2019/0316654 | A1 * | 10/2019 | Liu | B60K 6/36 |
| 2022/0153123 | A1 * | 5/2022 | Beck | F16H 3/12 |
| 2022/0176795 | A1 * | 6/2022 | Beck | B60K 6/547 |
| 2022/0194207 | A1 * | 6/2022 | Beck | B60K 6/40 |
| 2023/0173909 | A1 * | 6/2023 | Beck | B60K 6/448 |
| 2023/0173910 | A1 * | 6/2023 | Beck | B60K 6/387 |
| 2023/0191895 | A1 * | 6/2023 | Rulfi Fertilio | B60K 6/52 |
| 2023/0191896 | A1 * | 6/2023 | Rulfi Fertilio | F16H 61/688 74/661 |
| 2023/0191897 | A1 * | 6/2023 | Rulfi Fertilio | B60K 6/448 475/5 |

FOREIGN PATENT DOCUMENTS

| | | | |
|---|---|---|---|
| EP | 1232891 | A1 | 8/2002 |
| EP | 2679424 | A1 | 1/2014 |
| IT | 20162222 | A1 | 10/2017 |
| WO | 2017168377 | A1 | 10/2017 |

OTHER PUBLICATIONS

Crosse, J., "Under the skin: The secret to rapid gearshifts in a road car: Supercar maker Zenvo's seven-speed transmission shifts faster with no synchromesh," Autocar Website, Available Online at https://www.autocar.co.uk/car-news/technology/under-skin-secret-rapid-gearshifts-road-car, May 4, 2020, 10 pages.

Rulfi Fertilio, E., "Hybrid Vehicle Transmission With a Mechanical Reverse System," U.S. Appl. No. 17/499,917, filed Oct. 4, 2021, 35 pages.

"Energizing the Next Generation," Proceedings of the 12th Schaeffler Kolloquium, Jun. 29, 2022, Bühl, Germany, 5 pages.

* cited by examiner

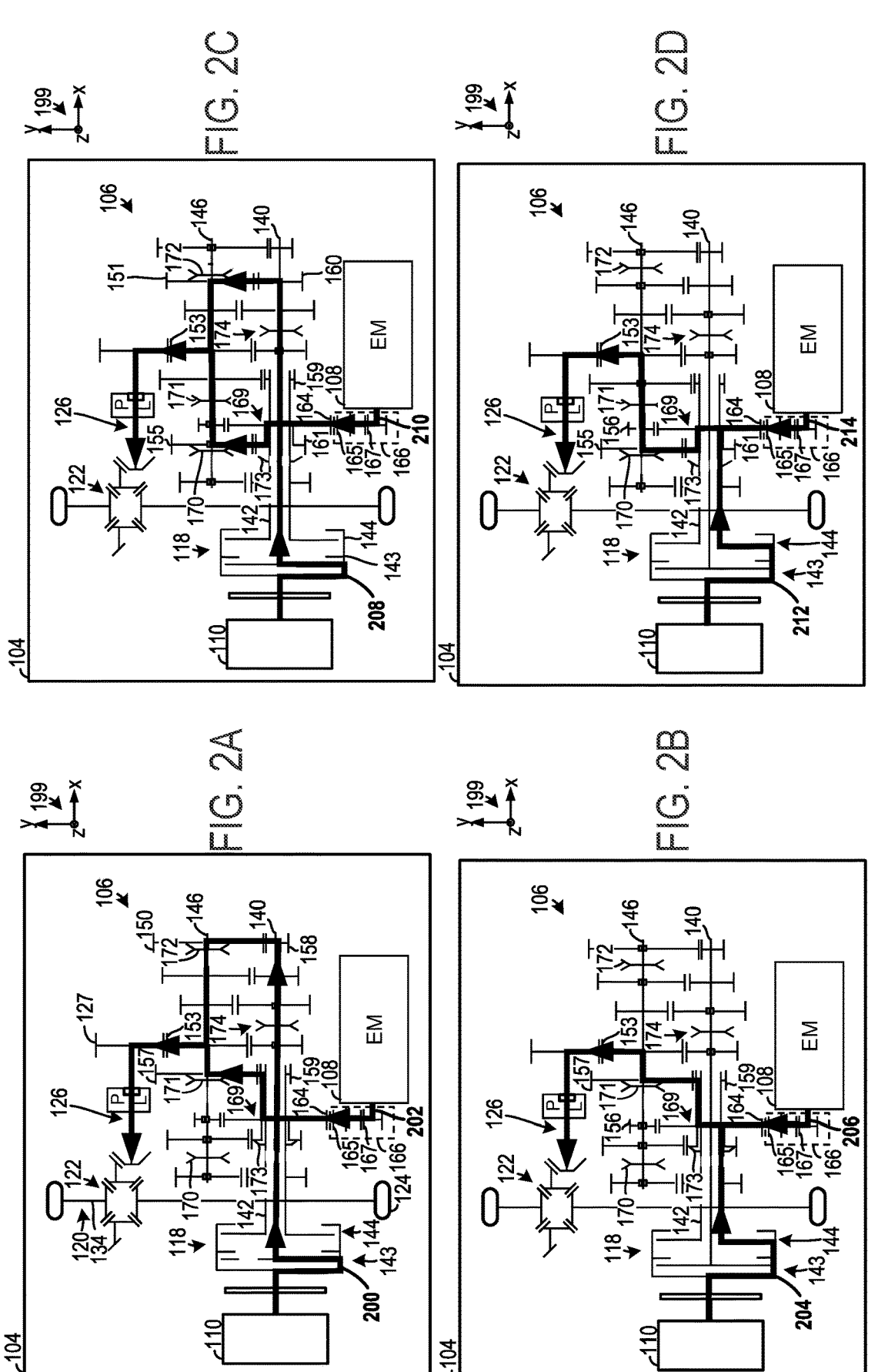

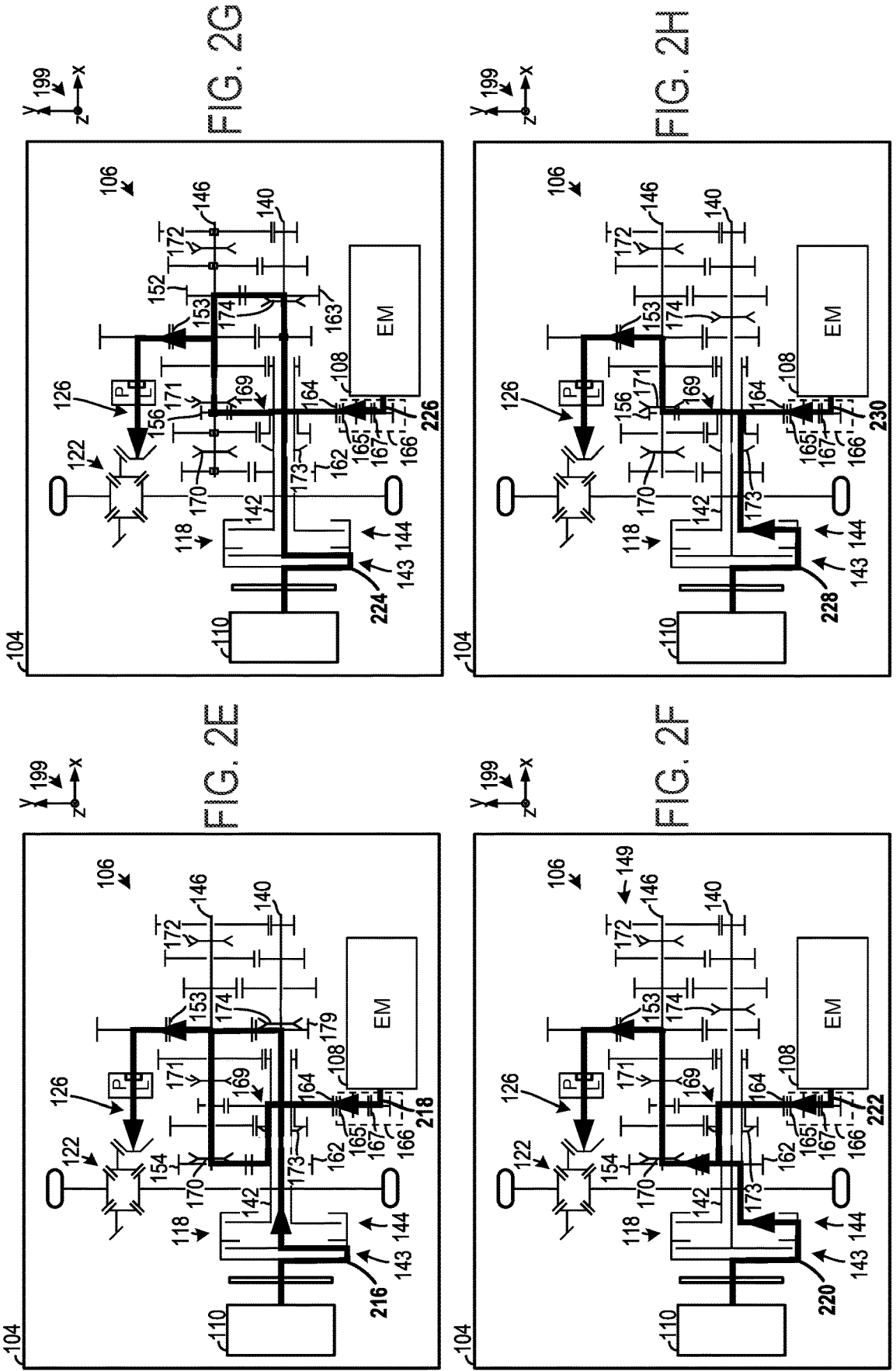

240

| UP SHIFT with GEAR PRESELECTED | | | DOWN SHIFT GEAR PRESELECTED | | | NO GEAR PRESELECTED | | Only ICE eM completely decoupled | eV Mode |
|---|---|---|---|---|---|---|---|---|---|
| ICE (110) | Gear preselected | eM (108) | ICE (110) | Gear preselected | eM (108) | ICE (110) | eM (108) | ICE (110) | eM (108) |
| 1 | 2 | 2/4 | 1 | 2 | 2/4 | 1 | 2/4/6/8/1 | 1 | |
| 2 | 3 | 2/4 | 2 | 1 | 2/4 | 2 | 2/4 | 2 | 2 |
| 3 | 4 | 4 | 3 | 2 | 2/4 | 3 | 2/4/6/8/3 | 3 (no if 4th or 8th gear is preselected) | |
| 4 | 5 | 4 | 4 | 3 | 4 | 4 | 4 | - | 4 |
| 5 | 6 | 6/8 | 5 | 4 | 4 | 5 | 2/4/6/8/5 | 5 (no if 4th or 8th gear is preselected) | |
| 6 | 7 | 6/8 | 6 | 5 | 6/8 | 6 | 6/8 | 6 | 6 |
| 7 | 8 | 8 | 7 | 6 | 6/8 | 7 | 2/4/6/8/7 | 7 (no if 4th or 8th gear is preselected) | |
| 8 | 7 | 8 | 8 | 7 | 8 | 8 | 8 | - | 8 |

MULTI-SPEED HYBRID TRANSMISSION AND TRANSMISSION OPERATING METHOD

CROSS-REFERENCE TO RELATED APPLICATION

The present application claims priority to U.S. Provisional Patent Application No. 63/265,685, entitled "MULTI-SPEED HYBRID TRANSMISSION AND TRANSMISSION OPERATING METHOD", and filed Dec. 17, 2021. The entire contents of the above-listed application are hereby incorporated by reference for all purposes.

TECHNICAL FIELD

The present description relates generally to a vehicle transmission and a method for operation of the transmission.

BACKGROUND & SUMMARY

Some powertrains in hybrid and other vehicle types have multi-faceted demands in relation to powertrain functionality and performance. However, previous transmission systems have exhibited issues with regard to modularity and cross-powertrain platform flexibility. For instance, the inventor has recognized that certain previous transmissions in hybrid and all electric vehicles as well as internal combustion engine (ICE) vehicles have demonstrated an inability to share common component layouts which creates design rigidity and hinders cross-platform development, in some instances. This design rigidity may increase the duration of transmission development and manufacturing. For example, transmissions with single and dual-clutch layouts may have incompatible architectures, especially in hybrid vehicles, which may lead to separate development and manufacturing processes, in some cases.

EP 1232891 B1 to Jouve et al., for example, discloses an automatic transmission in a hybrid vehicle. In Jouve's automatic transmission mechanical power is transferred to a primary shaft from both an engine and an electric motor at opposing ends of the shaft.

U.S. Pat. No. 9,618,085 B2 to Dzafic et al. discloses a seven speed dual-clutch transmission with a three axis layout where a geartrain for the motor has two axes to arrive at the primary shaft as well as an electric motor axis.

The inventor has recognized several drawbacks with Jouve's transmission as well as Dzafic's transmission. For instance, the use of a three axis layout and the accompanying housing in Dzafic's transmission, may present difficulties with regard to adapting the dual-clutch transmission for use in other vehicle platforms, such as automated manual transmissions (AMTs) or manual transmissions (MTs) that have a single clutch layout. On the other hand, Jouve's transmission may present challenges with regard to adapting the transmission for vehicle platforms with dual-clutch layouts. For instance, driving the primary shaft at opposing ends with an engine and electric motor may pose barriers to adapting the system for use in a dual-clutch transmission. The inventor has therefore recognized a desire to efficiently adapt a transmission for both single and dual-clutch arrangements. Further, the inventor has also recognized a desire to use a common transmission platform in both hybrid powertrains as well as internal combustion engine (ICE) powertrains. The inventor has even further recognized a desire to increase transmission efficiency and vehicle range while also delivering a higher transmittable torque by decreasing the length between the bearing supports. Still further the inventor has recognized a desire to expand the number of gear combinations that can be driven by the electric machine in a hybrid drive mode.

The inventor has developed a hybrid transmission system to at least partially overcome the aforementioned challenges and achieve the aforementioned design goals. In one example, the transmission system includes a multi-speed gearbox. The multi-speed gearbox includes a first primary shaft with a first set of gears positioned thereon and selectively coupled to an internal combustion engine (ICE) at a first end and a second primary shaft with a second set of gears positioned thereon. The gearbox further includes a secondary shaft with a second set of gears that mesh with the first set of gear and the second set of gears and an electric drive interface gear. The electric drive interface gear is idly mounted, free to spin, on the second primary shaft, positioned between two gears in the second set of gears, and configured to receive mechanical power from an electric machine. The multi-speed gearbox further includes, an output shaft with a first output shaft gear which is fixedly coupled thereto meshes with a gear on a secondary shaft and a second output shaft gear which meshes with a bevel gear in a differential that is positioned perpendicular to the electric machine. In this way, power from the electric machine may be effectively introduced into the multi-speed gearbox at a location that allows the gearbox to achieve a wide variety of operating modes and gearing combinations, thereby expanding the functionality of the transmission and enabling its performance to be increased, if wanted.

Further, in one example, the hybrid transmission system may further include an electric drive clutch designed to operate in: an engaged position where mechanical power is transferred from the electric machine to a gear in the second set of gears via the electric drive interface gear and a disengaged position where mechanical power is transferred from the electric machine to a gear in the third set of gears via the electric drive interface gear. In this way, the number of gear combinations that can be driven by the electric machine may be even further expanded, enabling the machine's efficiency to be increased.

Still further in one example, the electric drive clutch and a gear clutch may be arranged in a similar axial position along the second primary shaft and the secondary shaft, respectively and wherein the gear clutch is coupled to the secondary shaft and selectively coupled to a gear in the third set of gears. In this way, a compact clutch layout is achieved, thereby allowing the system to be more efficiently incorporated into a wide variety of vehicle platforms.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 2A-2H show mechanical power paths for different operating gears in the transmission system, depicted in FIG. 1.

FIG. 2I shows a chart that denotes the gearing for an internal combustion engine (ICE) and an electric machine, in the transmission system, depicted in FIG. 1, for upshifting and downshifting into preselected gears in a hybrid drive mode as well as the gears available to the electric machine in an electric vehicle (EV) mode.

FIGS. 4A-4E show sequential mechanical power paths in the transmission system, depicted in FIG. 1, during a shift event.

FIGS. 5A-5B show sequential mechanical power paths in the transmission system, depicted in FIG. 1, during another shift event.

DETAILED DESCRIPTION

Figure 1:
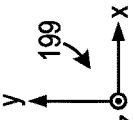
FIG. 1 shows a schematic representation of an example of a vehicle with a powertrain that includes a transmission system.

The following description relates to transmission systems and operating methods in vehicle powertrains that achieve a comparatively high level of modularity and design flexibility as well as performance in relation to prior transmission systems. The increased performance and adaptability is achieved by designing a multi-speed gearbox with the capability to use an engine and an electric machine to drive different gear ratios in a hybrid drive mode. The increased transmission system adaptability is also achieved, at least in part, through the use of a gear that is designed to serve as an interface for an electric drive unit that includes an electric machine. This gear is referred to herein as an electric drive interface gear. The electric drive interface gear is positioned coaxial to a primary shaft when the transmission is used in a hybrid vehicle with an automated manual transmission (AMT), a manual transmission (MT), or dual-clutch transmission (DCT). The electric drive interface gear also enables greater flexibility with regard to gear combinations that are driven by the electric machine and internal combustion engine (ICE) in the hybrid drive mode as well as the gears available in an electric vehicle (EV) drive mode and a kinetic energy recovery mode. The system's performance can be consequently increased due to the system's ability to selectively transfer power between the electric machine and multiple gears residing on a secondary shaft.

In the DCT embodiment, the electric drive interface gear is designed to selectively couple to an outer primary shaft. Further, an electric drive clutch may be used to engage and disengage the electric drive interface gear from the outer primary shaft. In this way, the power flow from the electric machine may either move from the electric drive interface gear to the secondary shaft, bypassing the primary shafts, or move from the electric drive interface gear to the outer primary shaft depending on the transmission's operating mode. Forming the electric drive clutch in this manner enables the transmission to operate in a wide number of modes, if wanted. These modes may include a hybrid drive mode where different gears can be driven by the ICE and the electric machine, an EV mode with multiple selectable gears, an ICE cranking mode, a battery charging mode, as well as a kinetic energy recovery mode. Further, the electric drive clutch allows the battery to be charged and the ICE to be cranked while the vehicle is at standstill and in motion. In this way, the transmission's capabilities are expanded in comparison to previous transmissions. Specifically, in one example, the electric drive clutch enables the ICE and the electric machine to drive different gear ratios in certain modes. To elaborate, in specific hybrid mode configurations, the electric machine may provide electric-boost to the transmission even while the dual-clutch assembly shifts between gears driven by the ICE, for instance. Consequently, system performance may be further increased, if so desired.

In both the AMT and the DCT architectures the number of transmission gears and the axial location of said gears and shaft support bearings may be substantially equivalent, if wanted. In this way, efficiency with regard to transmission system development and manufacturing may be increased by using similar gear and bearings arrangements in both transmission types, if desired. Further, a similar bearing and gear arrangement may be used in a full ICE transmission by removing the electric drive gear and other electric machine gears and slightly modifying the transmission's housing. Consequently, the transmission's modularity may be even further increased with relatively minor modifications to the transmission's architecture.

The transmission system's increased modularity can further allow a mechanical reverse assembly and a park-lock assembly to be efficiently incorporated into the transmission, if desired. In the mechanical reverse embodiment, the assembly may be coupled to the ends of the secondary and the primary shafts away from the engine. However, in other embodiments, reverse drive may be accomplished by designing the electric machine with electric reverse functionality where the machine spins in opposite directions to achieve forward and reverse drive operation. Consequently, transmission efficiency may be increased, when compared to the mechanical reverse embodiment. Further in the park lock embodiment, the park lock assembly may be designed to selectively inhibit movement of the transmission's output shaft (or pinion shaft) to facilitate efficient incorporation of the park lock assembly into the transmission. In this way, the transmission's capabilities may be further expanded without drastically altering the transmission's architecture, if wanted. Additionally, the kinematic layout of the multi-speed transmission described herein enables the axial length of the electric motor to be increased without modification to the transmission, if so desired.

FIG. 1 shows a schematic depiction of a vehicle 100 with a powertrain 102 that includes a transmission system 104 with a multi-speed gearbox 106. The vehicle may take a variety of forms in different embodiments, such as a light, medium, or heavy duty vehicle for use in both on and/or off road driving environments. Specifically, in one use-case example, the vehicle may be a high performance vehicle such as a hyper car, a sports car, or a grand tourer type sports car that is designed for comparatively high speed, high performance, and also long distance driving. However, numerous types of vehicles have been envisioned. The powertrain 102, and specifically the transmission system 104, is depicted as a hybrid powertrain where both an electric machine 108 (e.g., a traction motor such as a motor generator) and an ICE 110 (e.g., a spark and/or compression ignition engine, hydrogen internal combustion engine, and the like) or other suitable prime mover are used as motive power sources. However, as discussed in greater detail herein the powertrain may be adapted for use in an ICE vehicle, where the electric machine is omitted or in an all-electric vehicle where the ICE is omitted.

The electric machine 108 may include conventional components such as a rotor, a stator, housing, and the like for generating mechanical power as well as electrical power, during a regeneration mode, in some cases. Specifically, in one example, the electric machine may be a radial flux motor-generator which may achieve relatively high operating speeds in a compact package when compared to other types of motors such as axial flux motors. However, in other examples, an axial flux motor-generator may be used in the transmission system 104 which may however increase the motor's size and constrain its operating speed range, in some cases. Other types of electric machines for use in the transmission system 104 have also been envisioned. Further, the ICE 110 may include conventional components such as cylinder(s), piston(s), valves, a fuel delivery system, an intake system, an exhaust system, and the like.

The electric machine 108 may be electrically coupled to an energy storage device 112 (e.g., a battery, a capacitor, combinations thereof, and the like), via an inverter 114 when the electric machine is an alternating current (AC) machine. Thus, the inverter 114 is designed to change AC to direct current (DC) and vice versa. Arrows 116 denote the electrical power flow between the electric machine 108, the inverter 114, and the energy storage device 112. The inverter 114 may be installed on the transmission or on the vehicle side. In some vehicle platforms, the inverter may be installed on the vehicle side due to temperature and vibration profiles. Further, the energy storage device 112 may be mounted in the vehicle.

The transmission system 104 is illustrated as a dual-clutch transmission that includes a dual-clutch assembly 118, described in greater detail herein, although automated manual transmissions, manual transmissions, and full ICE transmissions have been envisioned and are described in greater detail herein. Thus, the dual-clutch assembly may generally be referred to as an ICE clutch assembly and may include a single clutch mechanism, in other examples. Further, in other examples, the transmission system 104 may be included in a transaxle which includes an axle 120, a differential 122, and the transmission system 104 incorporated into one unit. In this way, the transmission may be adapted for use in a mid-engine vehicle or a front-engine vehicle. However, in other examples, the transmission, axle, and/or differential may be packaged as separate units.

The transmission system 104 includes the multi-speed gearbox 106 designed to shift between different discrete operating gears. In the illustrated embodiment, the multi-speed gearbox has eight operating gears. However, in other examples, the multi-speed gearbox may have four or more operating gears or between four and ten operating gears. Still further in other examples, the multi-speed gearbox may have less than four operating gears which may however decrease powertrain performance, in some cases.

The multi-speed gearbox 106 may be configured to transfer torque to drive wheels 124 via the differential 122 (e.g., axle differential). To elaborate, an output shaft 126 (e.g., pinion shaft) with a bevel gear 128 (e.g., a bevel pinion) meshing with a bevel gear 130 (e.g., crown gear) linked to the differential case (or carrier) 132 may be used to form the mechanical attachment between the gearbox and the differential, although other suitable types of gears may be used in other examples. However, other suitable types of mechanical attachment may be used to couple the gearbox geartrain to the differential. Further, a drop gear 127 may be fixedly coupled (e.g., through a splined interface, a welded interface, other suitable connections, or combinations thereof) to the output shaft 126 and meshes with a fifth gear 153, described in greater detail herein. The drive wheels 124 may be rotationally coupled to the differential via axle shafts 134 and/or other suitable mechanical components. Rotational axes of the axle shafts 134 may be arranged perpendicular to the rotational axes of the electric machine 108, the ICE 110, the first primary shaft 140, the second primary shaft 142, the secondary shaft 146, and/or the output shaft 126. Designing the transmission system in this manner may enable the system to be efficiently packaged in the vehicle and used in a wider variety of vehicles, in some instances. However, in alternate examples, the axle shafts may be arranged parallel to the electric machine 108, the ICE 110, a first primary shaft 140, a second primary shaft 142, a secondary shaft 146, and/or the output shaft 126.

Further, the differential 122 may be any of an open differential, an electronic limited slip differential, a mechanical limited slip differential, and the like. The use of the limited slip differential may increase performance and vehicle dynamics with regard to vehicle traction while increasing the complexity of the differential. Conversely, the use of an open differential may decrease the differential's complexity (e.g., likelihood of degradation) while impacting traction under certain conditions, in relation to limited slip differentials. A rotational axis of the differential may be arranged perpendicular to the rotational axis of the electric machine 108. However, in other examples, the differential's rotational axis may be parallel to the electric machine's rotational axis.

The ICE 110 may include an output shaft 136 that may be rotationally coupled to a flywheel 138 or other suitable coupling mechanism such as a dual mass flywheel. Further, a shaft 139 may couple the flywheel 138 to the dual-clutch assembly 118 in the transmission system 104. Thus, the flywheel 138 may serve as an ICE interface. Further, the dual-clutch assembly 118 may selectively rotationally couple the flywheel 138 to a first primary shaft 140 and a second primary shaft 142. The first primary shaft 140 may be an inner shaft and the second primary shaft may be an outer primary shaft or vice versa that are coaxial. To expound, the second primary shaft 142 may be hollow and disposed concentrically about the first primary shaft 140 or vice versa. In alternate embodiments the dual-clutch assembly may be replaced with a single clutch assembly for use in a manual transmission or an automated manual transmission, discussed in greater detail herein.

The dual-clutch assembly 118 may include a first clutch mechanism 143 and a second clutch mechanism 144, which may be wet or dry friction clutches. The first clutch mechanism 143 may include plates (e.g., friction plates and/or separator plates), and in some cases springs, which are engageable to transfer torque from the flywheel 138 to the first primary shaft 140. As such, when the first clutch mechanism 143 is engaged, the flywheel 138 transfers torque to the first primary shaft 140. Conversely, when the first clutch mechanism 143 is disengaged, mechanical power transfer through the clutch mechanism is inhibited. Similarly, the second clutch mechanism 144 may include plates (e.g., friction plates and/or separator plates), and in some cases springs, which are engageable to transfer torque from the flywheel 138 to the second primary shaft 142. Thus, when the second clutch mechanism is engaged, the flywheel transfers torque to the second primary shaft and when the second clutch mechanism is disengaged torque transfer through the second clutch mechanism is inhibited. When the transmission system includes the dual-clutch assembly it may be referred to as a dual-clutch transmission system (e.g., a hybrid dual clutch transmission), in one example.

The multi-speed gearbox 106 may further include the secondary shaft 146. The secondary shaft 146 may be designed as a one or two-piece shaft. Sets of gears 147, 148, and 149 may reside on the first primary shaft 140, the second primary shaft 142, and the secondary shaft 146, respectively. Each of the sets of gears 147, 148, 149 may include multiple gears therein. The set of gears 147 on the first primary shaft 140 mesh with a portion of the gears in the gear set 149 on the secondary shaft 146. Specifically, the gears 150, 151, 152, 153 that mesh with the gears on the first primary shaft 140 may be referred to as odd gears and the gears 154, 155, 156, 157 on the secondary shaft 146 that mesh with gears on or coaxial to the second primary shaft 142 may be referred to as even gears. To elaborate, the gear 150 may be a first gear, the gear 157 may be a second gear, the gear 151 may be a third gear, the gear 155 may be a fourth gear, the gear 153 may be a fifth gear, the gear 154 may be a sixth gear, the gear 152 may be a seventh gear, and the gear 156 may be an eighth gear. This numbering of the driven gears on the secondary shaft (i.e., first gear through eighth gear) denotes the relative sizes of the gears with the first gear having the largest diameter gear and the eighth gear having the smallest. The first through eighth gears, on the secondary shaft, mesh with gears 158, 159, 160, 161, 179, 162, 163, and 164, respectively. The gears 158, 160, 163, and 179 are coaxial to the first primary shaft 140 and the gears 159, 161, 162, and 164 are coaxial to the second primary shaft 142. Thus, the first through the eighth gears denote the relative gear ratios between the gear combinations where the first gear has a higher numerical ratio than the second gear and so on. The pair of gears that are formed via the meshing between gears on the secondary shaft and gears on the primary shafts may be referred to as gear combinations. As such, the pair of gears 150 and 158 may be referred to as a first gear combination, the pair of gears 157 and 159 may be referred to as second gear combination, and so on.

In the illustrated example, the secondary shaft 146 may be positioned between the output shaft 126 and the primary shafts 140, 142 with regard to the y-axis. In this way, the compactness of the system may be increased. However, other transmission systems layouts may be used, in alternate examples.

The gear 164 is specifically an electric drive interface gear (e.g., electric machine interface gear) that meshes with a gear 165 in the electric machine gear set 166. The electric machine gear set 166 may further include a gear 167 that is coupled to the electric machine's output shaft 168. In the illustrated embodiment, the electric drive interface gear 164 forms a double gear unit 169 with the gear 161. In such an embodiment, the double gear unit 169 is idly mounted, free to spin, on the second primary shaft 142 and independently rotates thereon when it is not engaged by an electric drive clutch 173, described in greater detail herein. Bearings (e.g., roller bearings such as needle roller bearings) may be used to idly mount, free to spin, the double gear unit 169 to the second primary shaft 142. In this way, the gearbox achieves greater adaptability. The gears in the electric machine gear set 166 may be radially aligned with the electric machine interface gear 164 to increase system compactness. In other words, the gears in the electric machine gear set 166 and the electric machine interface gear 164 may be arranged in a similar position on the x-axis and therefore are aligned along the x-axis. In this way, the space efficiency of the transmission is increased, when compared to transmission that may use gears which are offset (with regard to the x-axis) along a layshaft.

Generally, as discussed herein, a component which is idly mounted to another may utilize one or more bearings (e.g., needle roller bearings, ball bearings, tapered roller bearings, combinations thereof, and the like) coupled to each component to achieve the idle mounting functionality where the component is free to spin on the shaft to which it is idly mounted. As such, when a gear is idly mounted to a shaft the gear and the shaft independently rotate. Specifically, in the illustrated example, the gears 150, 151, 154, 155, 156, 157 are idly mounted to the secondary shaft 146 via bearings 187. Further in the illustrated example, the gears 163, 179 are idly mounted to the first primary shaft 140 via bearings 188. Still further in the illustrated example, the gears 161, 164 are idly mounted to the second primary shaft 142 via a bearing 189. However, other idle mounting arrangements with respect to the gears in the transmission may be used in other embodiments. Gears that are engageable with the clutches described herein may be idly mounted on the shaft associated with the clutch to allow selective mechanical power transfer from the gear to the shaft. As such, the other transmission system embodiments described herein include idly mounted gears and the idly mounting of the gears is drawn in a manner, similar to FIG. 1 and repeated description of idle mounting is omitted for brevity.

The gear ratio drive by the electric machine 108 may be different (e.g., lower) than the gear ratio drive by the ICE 110. Consequently, an ICE and an electric machine with desired performance characteristics may be selected to enhance transmission performance.

Clutches 170, 171, 172 may be positioned on the secondary shaft 146. Each of the clutches 170, 171, 172 as well as clutch 174 may have two engaged positions and a disengaged position. When the clutches 170, 171, 172 are disengaged they provide no torque transfer between the corresponding gears and the secondary shaft 146. Conversely, when the clutches 170, 171, 172 are engaged they allow torque to be transferred between the gear they are engaging and the secondary shaft 146. When the clutch 174 is engaged it allows torque to be transferred between the engaged gear (either gear 179 or gear 163) and the first primary shaft 140.

The clutch 170 may be specifically designed to selectively engage the sixth gear 154 and the fourth gear 155. The clutch 171 may be designed to selectively engage the eighth gear 156 and the second gear 157. The clutch 172 may be designed to engage the third gear 151 and the first gear 150. Thus, the first gear, the second gear, the third gear, the fourth gear, the sixth gear, and the eighth gear may be idly mounted, free to rotate, on the secondary shaft 146 such that they are allowed to rotate independently from the shaft when the corresponding clutch is disengaged from the gear. Bearings may be used to idly mount the aforementioned gears on the secondary shaft. Conversely, the gear 158 may be fixedly coupled to the first primary shaft 140 for rotation therewith, the gears 159, 162 may be fixedly coupled to the second primary shaft 142 for rotation therewith, and the fifth gear 153 and the seventh gear 152 may be fixedly coupled to the secondary shaft 146 for rotation therewith. However, the gears in the multi-speed gearbox may have a different configuration with regard to fixed and idle attachment with their corresponding shafts, in other embodiments.

The clutch 174 may further be positioned on the first primary shaft 140. The clutch 174 is designed with two engagement positions. In the first engagement position, the clutch 174 couples the gear 179 to the first primary shaft 140 and in the second engagement position the clutch coupled the gear 163 to the first primary shaft. In this way, the transmission can shift between the fifth and seventh gears on the secondary shaft 146. The clutches 170, 171, 172, and 174 may be referred to as gear clutches.

The clutches 170, 171, 172, 174 as well as the remainder of the clutches described herein may be generally referred to as coupling devices. Further, the clutches 170, 171, 172, 174 as well as the remainder of the clutches described herein with regard to FIG. 1 as well as the remainder of the figures may be dog clutches, sliding sleeve clutches, synchronizers, or other combinations of these clutch types. A dog clutch may include protrusions on opposing axial faces of components in the clutch. A sliding sleeve clutch may include circumferential teeth on outer and inner clutch rings that mate with one another during clutch engagement and a synchronizer may include a synchronizer ring or other mechanism that allows the speed of the gear and the shaft to be matched prior to or during clutch engagement. Further, the clutches 170, 171, 172, 174 as well as the remainder of the clutches described herein may be actuated via electromechanical components, hydraulic components, and/or pneumatic components. Specifically, in one example, the clutches may be adjusted via shift forks, although other suitable actuation mechanisms have been contemplated.

Additionally, the electric drive clutch 173 may be concentric to the first and second primary shafts 140, 142. The electric drive clutch may specifically be a synchronizer, in one example, to facilitate smooth transitions between clutch disengagement and engagement. However, as previously discussed, the electric drive clutch may be a dog clutch or a sliding sleeve clutch, in other examples. The electric drive clutch 173 is designed to operate in a disengaged position where it is decoupled from the double gear unit 169 and therefore the electric drive interface gear 164. When the electric drive clutch 173 is disengaged, the mechanical power path from the electric machine 108 may therefore bypass the primary shafts 140, 142 and travel to the secondary shaft 146 via the gear 164 or the gear 161. Conversely, when the electric drive clutch 173 is engaged the double gear unit 169 is coupled for rotation with the second primary shaft 142. As such, when the electric drive clutch is engaged, mechanical power travels between the electric machine 108 to the second primary shaft 142. In this way, the electric machine can have a wider number of operating gears and the power from the electric machine may be introduced into different locations in the system. As a result, the transmission's adaptability is increased which may allow for the transmission's efficiency and performance to be increased, if desired.

The electric drive clutch 173 may be positioned along the primary shafts 140, 142 in a similar axial position with regard to the clutch 170 when the clutches are in a disengaged position. In this way, the clutches may be efficiently packaged in the multi-speed gearbox 106.

Further, in the transmission system 104, the ICE 110, the flywheel 138, and the dual-clutch assembly 118 may be provided proximate a first end 175 of the first primary shaft 140. Further, the electric drive clutch 173 is spaced away from the second end 176 of the first primary shaft 140. In this way, the electric machine may be placed on a lateral side of the transmission system 104, thereby decreasing the longitudinal length of the transmission, along an axis parallel to the x-axis, when compared to a hybrid transmission having a P2 type architecture when the motor is arranged between transmission's input clutch and the engine. The wheelbase 177 of the vehicle 100 may be consequently decreased, if desired. Further, the system may be more easily incorporated into the vehicle's frame when its axial length is decreased, when compared to transmission with longer axial lengths. Further, in comparison to transmission systems with P2 architectures, the transmission system 104 may have less rotating components during the EV mode when compared to P2 transmission systems. The transmission arrangement shown in FIG. 1 may be referred to as a P2.5 or P2/P3 hybrid architecture, in some instances. For instance, in the EV mode and the kinetic energy recovery mode, the first primary shaft 140, the gears 150, 151, as well as their respective bearings may not rotate. Further, in these modes and when the gearbox is operating in the fourth gear or the eighth gear, a mechanical pump linked directly to a clutch basket associated with the double clutch may not rotate. Additionally, when the gearbox is operating in the fourth gear in the EV mode, the second primary shaft 142 may not rotate. Transmission efficiency is increased as a result. Additionally, with the transmission system 104 in the ICE mode where the electric machine 108 does not provide power to the transmission, it is possible, at least in certain gears, to decouple the electric machine from the transmission as opposed to P2 style transmission architectures where decoupling the motor from the transmission is not possible.

The multi-speed gearbox 106 may further include a park lock assembly 178 that is designed to selectively inhibit motion of a parking sprocket 180 that is coupled to the output shaft 126. To accomplish this functionality, the park lock assembly 178 may include a parking pawl and/or other suitable mechanisms that engage the parking sprocket 180 when park lock is activated.

The vehicle 100 may further include a control system 190 with a controller 191. The controller 191 includes a processor 192 and a memory 193. The memory 193 may hold instructions stored therein that when executed by the processor cause the controller 191 to perform various methods, control techniques, and the like described herein. The processor 192 may include a microprocessor unit and/or other types of circuits. The memory 193 may include known data storage mediums such as random access memory, read only memory, keep alive memory, combinations thereof, and the like.

The controller 191 may receive various signals from sensors 194 (e.g., speed sensors, pressure sensors, clutch configuration sensors, temperature sensors, and the like) positioned in the vehicle 100 (e.g., the powertrain 102 and specifically the transmission system 104). Conversely, the controller 191 may send control signals to various actuators 195 at different locations in the vehicle and transmission system, for clutch engagement, gear shifting, electronic differential actuation, and the like, for instance, based on received signals and instructions stored in the memory 193 of the controller 191. For instance, the controller 191 may send command signals to the electric drive clutch 173 or an actuator of the clutch. Responsive to the electric drive clutch 173 receiving the command signal, the clutch's actuator may be used to shift the clutch its engaged position. The other controllable components in the transmission such as an electric pump, solenoid valves, and the like, and more generally the vehicle, may be operated in a similar manner with regard to sensor signals and actuator adjustment. Further, the controller 191 may be designed to execute instructions for shifting the gearbox clutches into positions that achieve the power paths in the different modes discussed in greater detail herein. For instance, the controller 191 may be designed to disengage the dual-clutch assembly 118 and engage the clutch 170 or the clutch 171 in an EV mode. The components that may be adjusted by the controller 191 may include the clutches 170, 171, 172, 173, 174, the park lock assembly 178, the inverter 114, the electric machine 108, the ICE 110, the differential 122 in the case of an electronic limited slip differential, other external devices/auxiliaries such as an air brake system and a suspension system, and the like. However, in other examples, separate controllers may adjust at least a portion of these controllable components.

One or more input device(s) 196 may be further included in the control system 190. The input devices 196 may include a gear selector that permits the vehicle operator to select an active gear from a group of drive gears and/or a forward, reverse, and neutral drive mode. The input devices 196 may further include a transmission system mode selector that permits the operator to select the vehicle's current operating mode from a group of operating modes that may include a hybrid drive mode, an EV mode, and/or an ICE mode. However, in other examples, more automated techniques for gear and/or drive mode selection may be used in the transmission system.

Further, the electric machine 108, as well as being controlled with regard to torque and speed via the inverter, may be designed to be spun in both forward drive and reverse drive directions, which are opposite one another, to allow the system to achieve electric reverse functionality. To elaborate, the transmission system 104 may be operated in a reverse drive mode where the electric machine 108 spins in a reverse drive direction to propel the vehicle in a reverse direction. The other transmission systems described herein which do not have mechanical reverse assemblies may also be designed with electric reverse functionality where the electric machine is designed to rotate in opposing directions. Using electric reverse in the system deceases system weight and size when compared to transmission systems using mechanical reverse assemblies.

An axis system 199 is provided in FIG. 1, as well as FIGS. 2A-2H and 2J-27, for reference. The z-axis may be a vertical axis (e.g., parallel to a gravitational axis), the y-axis may be a lateral/transverse axis (e.g., horizontal axis), and/or the x-axis may be a longitudinal axis, in one example. However, the axes may have other orientations, in other examples.

Further, as discussed in greater detail herein, the architecture of the transmission system 104 may be highly adaptable and efficiently modified to meet end-use design targets for a variety of vehicle platforms. For instance, the electric machine may be omitted for full ICE vehicle platforms. In other examples, the dual-clutch assembly may be efficiently replaced with a single clutch assembly for automated manual transmission (AMT) platforms or manual transmission (MT) platforms.

In the dual-clutch transmission, shown in FIG. 1, the gear shifting can be semi-automatic, through the paddles (or other suitable input devices) commanded by the driver, or pure automatic. In manual transmission (MT) the shifting system, intended as the driver interface, must be reviewed, by replacing the paddles with for example a gear lever, a stick shift, and/or mechanical levers to connect the gear lever to the gearbox and introducing the clutch pedal so both, ICE clutch actuation and gear shifting are under the control of the driver.

FIGS. 2A-2H depict mechanical power paths through the transmission system 104 in a hybrid drive mode where different gears on the primary and secondary shaft are preselected by an operator or automatically via a gear selection algorithm in the controller. As such, in each of FIGS. 2A-2H the ICE 110 and the electric machine 108 are operated to generate rotational output. FIGS. 2A-2H specifically represent the first through eighth gears. However, as previously discussed, the transmission system may have an alternate number of operating gears and/or other power paths in the operating gears. Further, the components of the transmission system 104 depicted in FIGS. 2A-2H as well as FIG. 2J and FIGS. 4A-10D are similarly numbered and redundant description is omitted for concision.

In FIG. 2A, the transmission system 104 drives the first gear 150 in a hybrid drive mode, with a first gear power path 200. Specifically, in the first gear, the first clutch mechanism 143 in the dual-clutch assembly 118 is engaged to lock the ICE 110 for rotation with the first primary shaft 140, the clutch 172 is engaged with the first gear 150, the electric drive clutch 173 is engaged, and the clutch 171 is engaged with the second gear 157. The remainder of the clutches 170, 174 are disengaged in their neutral positions.

The first gear power path 200 unfolds as follows: power is transferred from the ICE 110 to the first clutch mechanism 143 of the dual-clutch assembly 118 to the first primary shaft 140. Next, the power path 200 moves through the first primary shaft 140 to the first gear 150 by way of the gear 158 fixed to the first primary shaft, and continues to travel through the secondary shaft 146 to the fifth gear 153.

Next, power is transferred from the fifth gear 153 to the output shaft 126 by way of the drop gear 127. Thus, from the output shaft 126, power is transferred to the differential 122. Further, it will also be understood that the power path may travel through the differential to the axle shafts 134 and to the drive wheels 124. In each of the operating gears, the portion of the power path from the fifth gear 153 to the differential 122 via the output shaft 126 is identical, and redundant description is omitted for brevity.

The power path 200 further includes an electric drive branch 202, that travels from the electric machine 108 to the electric machine gear set 166, from the electric machine gear set to the electric drive interface gear 164, from the electric drive interface gear to the second primary shaft 142 vis the electric drive clutch 173, from the second primary shaft to the gear 159, from the gear 159 to the second gear 157, from the second gear to the secondary shaft 146, and from the secondary shaft to fifth gear 153. The first gear power path allows the electric machine to drive the second gear while the ICE drives the first gear. Consequently, the electric machine and the internal combustion engine may be more efficiently operated.

In FIG. 2B, the transmission system 104 drives the second gear 157 in a hybrid drive mode, with a second gear power path 204. Specifically, in the second gear, the second clutch mechanism 144 in the dual-clutch assembly 118 is engaged to lock the ICE 110 for rotation with the second primary shaft 142, the electric drive clutch 173 is engaged with the double gear unit 169, and the clutch 171 is engaged with the second gear 157. The remainder of the clutches 170, 172, 174 are disengaged in their neutral positions.

The second gear power path 204 unfolds as follows: power is transferred from the ICE 110 to the second clutch mechanism 144 of the dual-clutch assembly 118 to the second primary shaft 142. Next, the power path 204 moves through the second primary shaft 142 to the second gear 157 by way of the gear 159 that is fixed to the secondary shaft 146. Next, the power moves from the second gear 157 to the secondary shaft 146, from the secondary shaft to the fifth gear 153.

The power path 204 further includes an electric drive branch 206, that travels from the electric machine 108 to the electric machine gear set 166, from the electric machine gear set to the electric drive interface gear 164, and from the electric drive interface gear to the second primary shaft 142. In other second gear configurations, the ICE 110 may run the second gear while the electric machine 108 runs another gear such as the fourth gear, thereby increasing the system's adaptability and performance, if wanted.

In FIG. 2C, the transmission system 104 drives the third gear 151 in a hybrid drive mode, with a third gear power path 208. Specifically, in the third gear, the first clutch mechanism 143 in the dual-clutch assembly 118 is engaged to lock the ICE 110 for rotation with the first primary shaft 140, the clutch 170 is engaged with the fourth gear 155, and the clutch 172 is engaged with the third gear 151. The remainder of the clutches 171, 174 as well as the electric drive clutch 173 are disengaged in their neutral positions.

The third gear power path 208 unfolds as follows: power is transferred from the ICE 110 to the first clutch mechanism 143 of the dual-clutch assembly 118 and then to the first primary shaft 140. Next, the power path 208 moves through the first primary shaft 140 to the third gear 151 by way of the gear 163 that is fixed to the first primary shaft 140. Next, the power path travels from the third gear 151 to the secondary shaft 146 and from the secondary shaft 146 to the fifth gear 153.

The power path 208 further includes an electric drive branch 210, that travels from the electric machine 108 to the electric machine gear set 166, from the electric machine gear set 166 to the electric drive interface gear 164, from the electric drive interface gear 164 to the secondary shaft 146 via the fourth gear 155 by way of gear 161. Next the electric drive branch 210 of the power path travels from the secondary shaft to the fifth gear 153.

In FIG. 2D, the transmission system 104 drives the fourth gear 155 in a hybrid drive mode, with a fourth gear power path 212. Specifically, in the fourth gear, the second clutch mechanism 144 in the dual-clutch assembly 118 is engaged to lock the ICE 110 for rotation with the second primary shaft 142 and the clutch 170 is engaged with the fourth gear 155. The remainder of the clutches 171, 172, 174 as well as the electric drive clutch 173 are disengaged in their neutral positions.

The fourth gear power path 212 unfolds as follows: power is transferred from the ICE 110 to the second clutch mechanism 144 of the dual-clutch assembly 118 to the second primary shaft 142. Next, the power path 212 moves through the second primary shaft 142 to the fourth gear 155 by way of the gear 161. Next, the power path travels from the fourth gear 155 to the secondary shaft 146 and from the secondary shaft 146 to the fifth gear 153.

In the electric drive branch 214 of the power path 212, power travels from the electric machine 108 to the electric machine gear set 166, from the electric machine gear set to the electric drive interface gear 164, and from the electric drive interface gear to the fourth gear 155 by way of gear 161, bypassing the primary shafts.

In FIG. 2E, the transmission system 104 drives the fifth gear ratio 153 in a hybrid drive mode, with a fifth gear power path 216. Specifically, in the fifth gear, the first clutch mechanism 143 in the dual-clutch assembly 118 is engaged to lock the ICE 110 for rotation with the first primary shaft 140, the clutch 170 is engaged with the sixth gear 154, the electric drive clutch 173 is engaged with the double gear unit 169 and the second primary shaft 142, and the clutch 174 is engaged with the gear 179. The remainder of the clutches 171, 172 are disengaged in their neutral positions.

The fifth gear power path 216 unfolds as follows: power is transferred from the ICE 110 to the first clutch mechanism 143 of the dual-clutch assembly 118 to the first primary shaft 140. Next, the power path 216 moves through the first primary shaft 140 to the fifth gear 153 by way of the gear 179.

In the electric drive branch 218 of the power path 216, power travels from the electric machine 108 to the electric machine gear set 166, from the electric machine gear set to the electric drive interface gear 164, from the electric drive interface gear to the second primary shaft 142 via the electric drive clutch 173, and from the second primary shaft to the gear 162. Next the power path travels to the sixth gear 154 by way of the gear 162 that is coupled to the second primary shaft 142. From the sixth gear 154 power moves through the secondary shaft 146 to the fifth gear 153 in the electric drive branch 218.

In FIG. 2F, the transmission system 104 drives the sixth gear 154 in a hybrid drive mode, with a sixth gear power path 220. Specifically, in the sixth gear, the second clutch mechanism 144 in the dual-clutch assembly 118 is engaged to lock the ICE 110 for rotation with the second primary shaft 142, the electric drive clutch 173 is engaged with the double gear unit 169 and the second primary shaft 142, and the clutch 170 is engaged with the sixth gear 154. The remainder of the clutches 171, 172, 174 are disengaged in their neutral positions.

The sixth gear power path 220 unfolds as follows: power is transferred from the ICE 110 to the second clutch mechanism 144 of the dual-clutch assembly 118 to the second primary shaft 142. Next, the power path 220 moves through the second primary shaft 142 to the sixth gear 154 by way of the gear 162 that is coupled to the second primary shaft 142. Next the power path travels from the second primary shaft 142 to the gear 162, from the gear 162 to the sixth gear 164, from the sixth gear to the secondary shaft 146, and from the secondary shaft 146 to the fifth gear 153.

In the electric drive branch 222 of the power path 220, power travels from the electric machine 108 to the electric machine gear set 166, from the electric machine gear set to the electric drive interface gear 164, and from the electric drive interface gear 164 to the second primary shaft 142 by way of the electric drive clutch 173.

In FIG. 2G, the transmission system 104 drives the seventh gear 152 in a hybrid drive mode, with a seventh gear power path 224. Specifically, in the seventh gear, the first clutch mechanism 143 in the dual-clutch assembly 118 is engaged to lock the ICE 110 for rotation with the first primary shaft 140, the clutch 174 is engaged with the gear 163, and the clutch 171 is engaged with the fourth gear 154. The remainder of the clutches 171, 172, 173 are disengaged in their neutral positions.

The seventh gear power path 224 unfolds as follows: power is transferred from the ICE 110 to the first clutch mechanism 143 of the dual-clutch assembly 118 and then to the first primary shaft 140. Next, the power path 224 moves through the first primary shaft 140 to the seventh gear 152 by way of the gear 163 that is locked for rotation with the first primary shaft 140 via the clutch 174. Next power travels through the secondary shaft 146 to the fifth gear 153.

In the electric drive branch 226 of the power path 224, power travels from the electric machine 108 to the electric machine gear set 166, from the electric machine gear set to the electric drive interface gear 164, from the electric drive interface gear to the eighth gear 156, from the eighth gear to the secondary shaft 146, and from the secondary shaft to the fifth gear 153.

In FIG. 2H, the transmission system 104 drives the eighth gear 156 in a hybrid drive mode, with an eighth gear power path 228. Specifically, in the eighth gear, the second clutch mechanism 144 in the dual-clutch assembly 118 is engaged to lock the ICE 110 for rotation with the second primary shaft 142 and the clutch 171 is engaged with the eighth gear 156. The remainder of the clutches 170, 172, 174 as well as the electric drive clutch 173 are disengaged in their neutral positions.

The eighth gear power path 228 unfolds as follows: power is transferred from the ICE 110 to the second clutch mechanism 144 of the dual-clutch assembly 118 to the second primary shaft 142. Next, the power path 228 moves through the second primary shaft 142 to the eighth gear 156 by way of the electric drive interface gear 164. Next power travels through the secondary shaft 146 to the fifth gear 153.

In the electric drive branch 230 of the power path 228, power travels from the electric machine 108 to the electric machine gear set 166, from the electric machine gear set to the electric drive interface gear 164, and from the electric drive interface gear to the eighth gear 156.

FIG. 2I illustrates a table 240 corresponding to an ICE mode, hybrid drive mode and an EV mode for the transmission system 104, depicted in FIGS. 1-2H. The columns of the table 240 indicates the selected gear, the gear driven by the ICE 110, and the gear drive by the electric machine 108 during upshifting and downshifting. Additionally, with other layouts different modes can be obtained, if wanted. Different driving strategies may be adopted to increase fuel economy or performance.

In the ICE mode, the ICE 110 may drive the first gear, the second gear, and the sixth gear. Further, in the ICE mode, the ICE 110 may drive the third gear, the fifth gear, and the seventh gear if the fourth or eighth gear has not been preselected.

In the illustrated example, during an up-shift when the second gear or third gear is preselected, the electric machine 108 may drive either the second gear or the fourth gear while the ICE 110 transitions from its current operating gear to the selected gear. Further, during an up-shift when the sixth gear or the seventh gear is preselected, the electric machine 108 may drive either the sixth gear or the eighth gear.

Conversely, during a down-shift when the first gear or the second gear is preselected, the electric machine 108 may drive either the second gear or the fourth gear. Further, during a down-shift when the fifth gear or the sixth gear is preselected, the electric machine may drive either the sixth gear or the eighth gear.

Table 240 further shows the gearing for the ICE 110 and the electric machine 108 in a mode where no gear is preselected. In this operating mode, when the ICE 110 is driving the first gear, the electric machine 108 may drive the first gear, the second gear, the fourth gear, the sixth gear, or the eighth gear. Further, in such an operating mode when the ICE is driving the second gear, the electric machine may drive the second gear or the fourth gear. Further, when the ICE is driving the third gear, the electric machine may drive the second gear, the third gear, the fourth gear, the sixth gear, or the eighth gear.

Additionally, when no gear is preselected and when the ICE is driving the fourth gear, the electric machine may drive the fourth gear. When the ICE is driving the fifth gear, the electric machine may drive the second gear, the fourth gear, the fifth gear, the sixth gear, or the eighth gear. Still further, when the ICE is driving the sixth gear, the electric machine may drive the sixth gear or the eighth gear. When the ICE is driving the seventh gear, the electric machine may drive the second gear, the fourth gear, the sixth gear, the seventh gear, or the eighth gear. Further, when the ICE drives the eighth gear, the electric machine may similarly drive the eighth gear.

Table 240 further shows the gearing for the electric machine 108 in an EV mode where the ICE is not operational. As depicted, the electric machine 108 may be operated in any of the even gears during the EV mode. Further, in certain transmission architectures, such as the transmission systems, shown in FIGS. 17 and 18 which are described in greater detail herein, the electric machine may also be operated in the odd gears during the EV mode.

Additionally, during a mode where engine cranking is occurring, the EV mode is active, and the vehicle is in motion, the ICE may be cranked using the first or second clutch mechanism in the dual-clutch assembly. Consequently, the system may transition to the hybrid mode from the EV mode over a wide range of operating conditions.

It will be understood that in certain examples, the transmission system 104 may achieve over one hundred distinct full ICE, hybrid, and EV modes, although the end-user may not utilize all the modes. Thus, the transmission has a high level of adaptability.

Figure 2J:
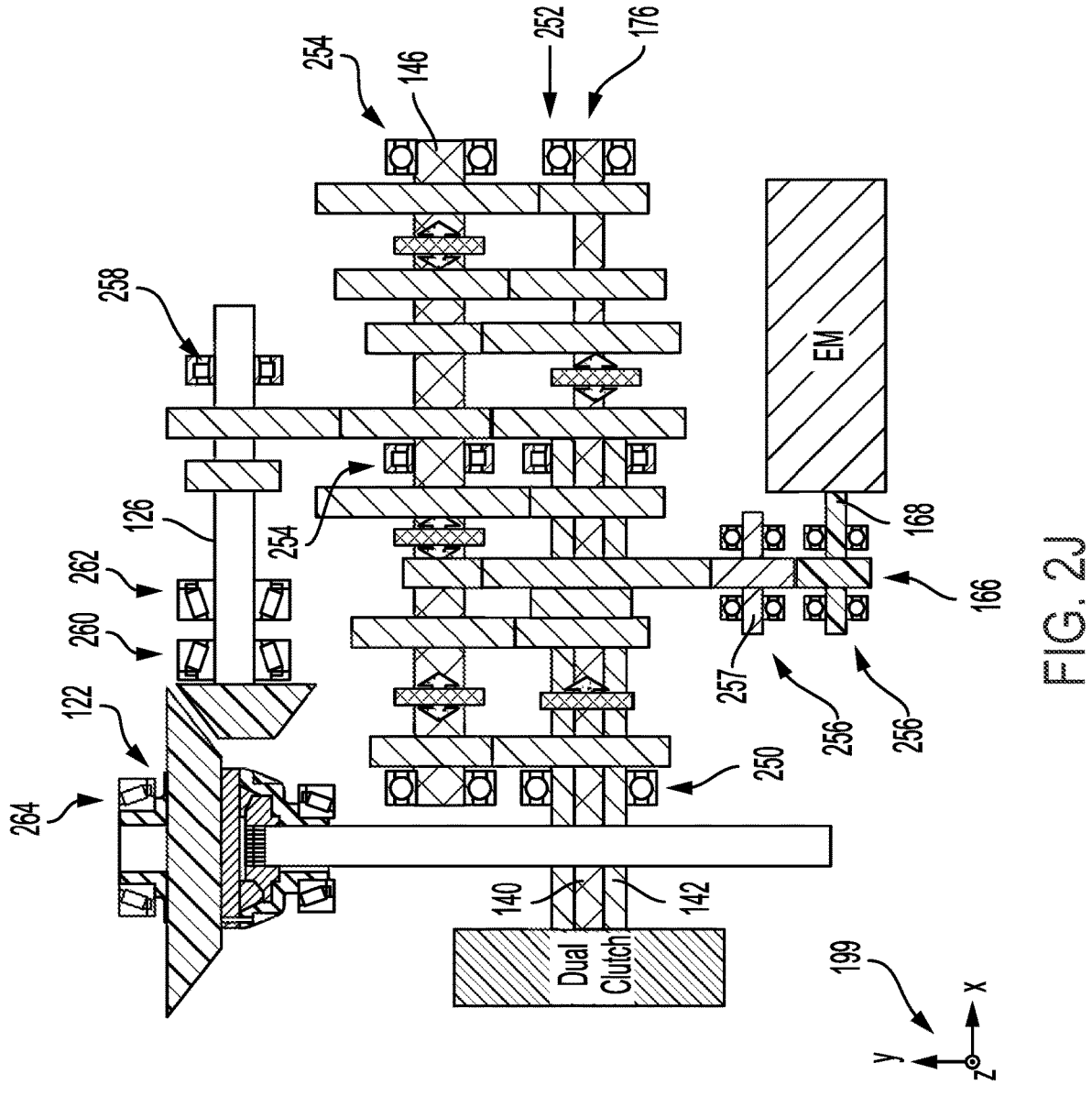
FIG. 2J shows an exemplary bearing arrangement in the transmission system, depicted in FIG. 1.

FIG. 2J shows bearings 250 coupled to the second primary shaft 142 and a bearing 252 coupled to the end 176 of the first primary shaft 140. As described herein a bearing supports and permits rotation of the component to which it is attached and may include inner and outer races as well as rolling elements (e.g., balls, cylindrical rollers, tapered cylindrical rollers, and the like). Further, bearings 254 are coupled to the secondary shaft 146, in the illustrated embodiment. Bearings 256 are further coupled to the shafts 257 and 168 that are coupled to the electric machine gear set 166. The abovementioned bearings may be ball bearings, although other types of bearings have been contemplated.

Bearings 258, 260, 262 may be further coupled to the output shaft 126. The bearings 260, 262 are specifically illustrated as tapered roller bearings and the bearing 258 is illustrated as a cylindrical roller bearing, although other types of bearings may be used in the system in other embodiments. The layout, number, and/or types of bearings in the system may be altered in other embodiments. Bearings 264 may also be coupled to the differential 122. At least a portion of the bearings in the transmission system may form a set of bearings.

Figures 4A, 4B, 4C, 4D:
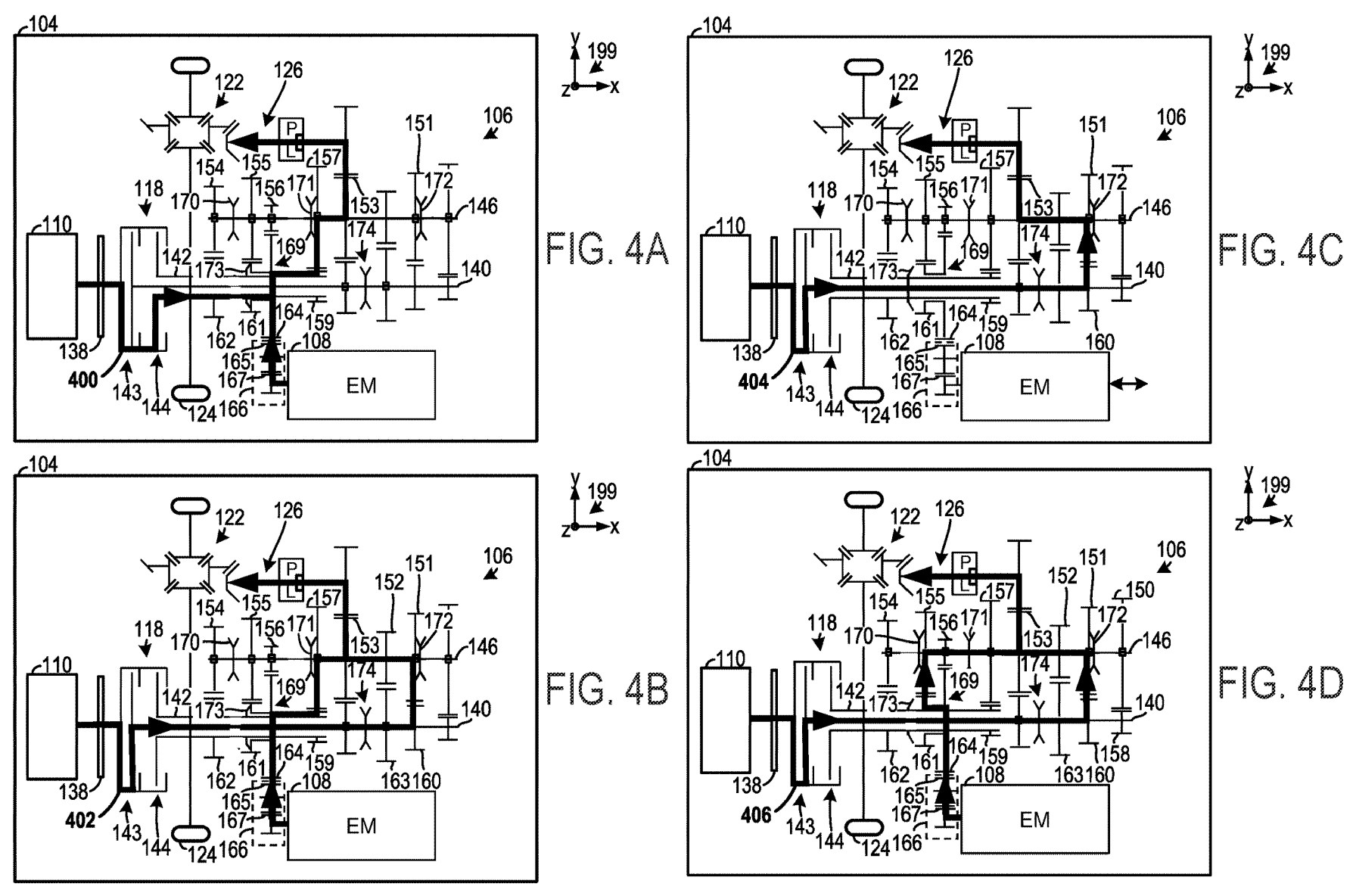
Figures 4E, 5A, 5B:
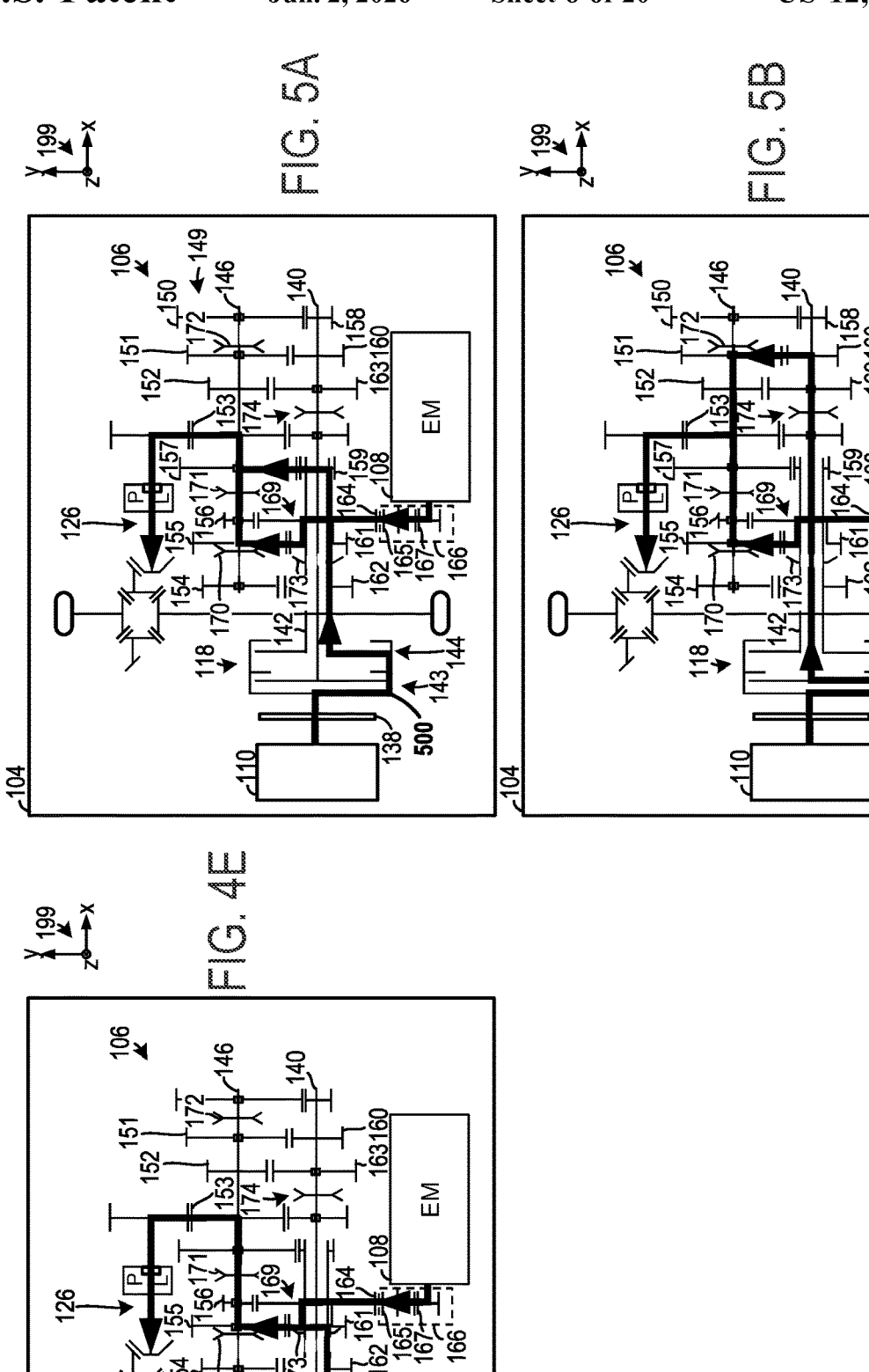

FIGS. 4A-4E show a shifting strategy for the transmission system 104 where the multi-speed gearbox 106 is shifted from the second gear 157 to the third gear 151 and then from the third gear to the fourth gear 155, while the system is operating in a hybrid mode. Further, mechanical power paths 400, 402, 404, 406, 408 are shown in FIGS. 4A-4E, respectively. Specifically, as shown in FIG. 4A, the transmission system 104 is operating in the second gear 157. As such, the clutch 171 engages the second gear 157 and the clutch 172 engages the third gear 151 in anticipation of the upshift to the third gear. Further, the electric drive clutch 173 is engaged in FIG. 4A and the second clutch mechanism 144 in the dual-clutch assembly 118 is engaged. The system enables seamless gear shifting and powershifting, if so desired.

Next in FIG. 4B, the first clutch mechanism 143 in the dual-clutch assembly 118 is engaged while the second clutch mechanism 144 is disengaged to allow power to be transferred from the ICE 110 to the third gear 151, while engagement of the electric drive clutch is sustained. During this dual-clutch shifting event, the electric machine 108 continues to drive the second gear 157.

Next in FIG. 4C, the clutch 171 is disengaged from the second gear 157, the electric drive clutch 173 is disengaged, and the ICE 110 continues to transfer power to the third gear 151. Next in FIG. 4D, the clutch 170 is engaged with the fourth gear 155 and power is transferred from the electric machine 108 to the fourth gear.

Next in FIG. 4E, the second clutch mechanism 144 in the dual-clutch assembly 118 is engaged, the electric drive clutch 173 is engaged, and the first clutch mechanism 143 is disengaged to allow power to travel from the ICE 110 as well as the electric machine 108 to the fourth gear 155. In this way, the gearbox can be smoothly and efficiently shifted between the odd and even gears. Specifically, as shown in FIGS. 4D and 4E the electric machine 108 can provide continuous power transfer to the drive wheels while the dual-clutch assembly 118 shifts the gears driven by the ICE 110, referred to as electric-boost functionality.

FIGS. 5A, 5B, and 4E show another shifting strategy that may be implemented in the transmission system 104. In this shifting sequence the multi-speed gearbox 106 is shifted from the second gear 157 to the third gear 151 (and then to the fourth gear, as shown in FIG. 4E) while the transmission system 104 is operating in the hybrid mode. In this maneuver, opposed to the aforementioned shifting strategy, the electric machine 108 may continuously provide electric boost to the transmission and there may be no torque drop while the ICE shifts from the second gear to the third gear and then from the third gear to the fourth gear. Further, mechanical power paths 500, 502 are shown in FIGS. 5A-5B, respectively. Specifically, as shown in FIG. 5A, power is transferred from the ICE 110 to the second gear 157 while power is transferred from the electric machine 108 to the fourth gear 155. Further, as shown in FIG. 5A, the clutch 172 is engaged with the third gear 151 in anticipation of a shift. The system enables seamless gearshifting and powershifting, if desired.

To shift from the second gear to the third gear, the second clutch mechanism 144 in the dual-clutch assembly is disengaged while the first clutch mechanism 143 is engaged, as shown in FIG. 5B. Several gear shifting strategy including different clutch control strategies such as clutch cross-shifting may be adopted in order to obtain a smooth seamless shifting or a fast seamless shifting. As such, power flows from the ICE 110 to the third gear while power flows from the electric machine 108 to the fourth gear. In this way, the electric machine can provide electric boost functionality, when desired, thereby increasing system performance. To elaborate, the multi-speed gearbox may be configured to enable the electric machine 108 to drive a gear that is higher than, lower than, or the same as the gear driven by the ICE. In this arrangement, the electric machine achieves a similar functionality to hybrid systems with P3 type architectures where the motor is coupled to the transmission's output shaft. To elaborate, in the abovementioned conditions, the electric-boost functionality may be provided in the first through fourth gears. Consequently, the system's performance is enhanced.

Figures 6, 7A, 7B, 7C:
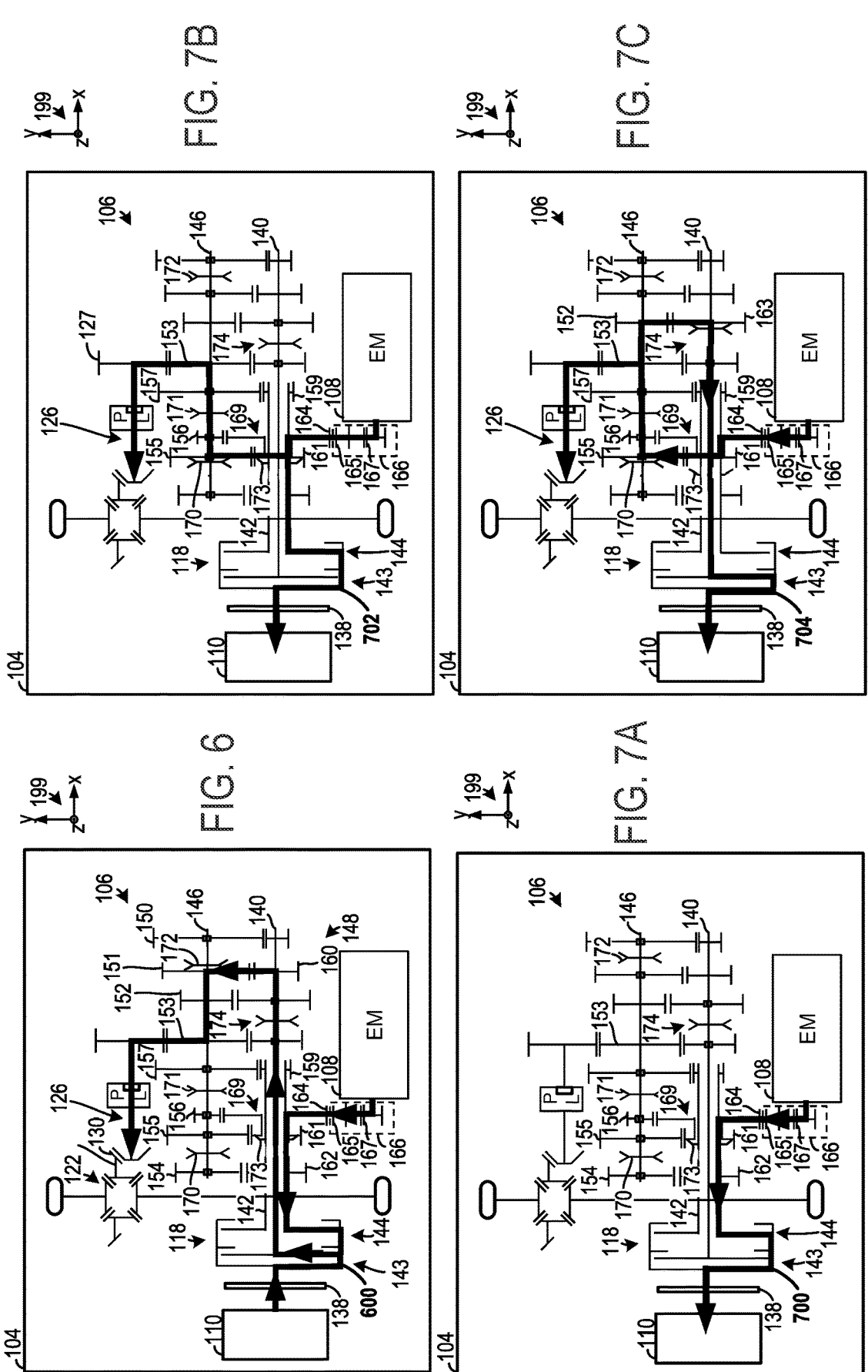
FIG. 6 shows a mechanical power path in the transmission system, depicted in FIG. 1, where the ICE and the electric machine are driving a common gear and the mechanical power from the electric machine travels through a clutch.
FIGS. 7A-7C show mechanical power paths that occur in the transmission, depicted in FIG. 1, in different ICE cranking modes.

FIG. 6 shows the transmission system 104 operating in another mode where both the electric machine 108 and the ICE 110 transfer power to an odd gear on the secondary shaft 146 in a hybrid mode with a power path 600. To elaborate, both the electric machine 108 and the ICE 110 are transferring power to the third gear 151. However, it will be appreciated that the system may also transfer power to the first gear 150, the fifth gear 153, and the seventh gear 152, in a similar manner. To accomplish this odd gear power transfer, the electric drive clutch 173 is engaged and power travels from the electric machine 108 to the second primary shaft 142 and from the second primary shaft to the dual-clutch assembly 118 where the power is combined with power from the ICE and transferred to the first primary shaft 140. In this way, the options for the system's driven gears in the hybrid mode is expanded, to allow for further gains in system performance.

FIGS. 7A-7C show the transmission system 104 operating in different cranking modes where the electric machine 108 is used to induce start-up in the ICE 110. Generally, during cranking the electric machine 108 may drive the second gear 157, the fourth gear 155, the sixth gear 154, or the eighth gear 156. Further, cranking operation may be performed through either of the clutches in the dual-clutch assembly 118 while the vehicle is in motion.

Power paths 700, 702, and 704 are shown in FIGS. 7A-7C, respectively. Specifically, as shown in FIG. 7A, power is transferred from the electric machine 108 to the second primary shaft 142 by way of the electric drive clutch 173, which is engaged. From the second primary shaft 142 power is transferred to the ICE via the dual-clutch assembly 118. Further, in the mode shown in FIG. 7A, the clutches 170, 171, 172, 174 are disengaged. The cranking mode shown in FIG. 7A may be used while the vehicle is at standstill (e.g., at or approaching zero speed).

FIGS. 7B-7C show cranking modes that can be implemented while the vehicle is in motion (e.g., vehicle speed is greater than zero). Specifically, in both cranking modes, power is transferred from the electric machine 108 to the ICE 110 as well as the differential 122. As shown specifically, in FIG. 7B, the power is transferred from the electric machine 108 to the dual-clutch assembly 118 via the second primary shaft 142 and to the fourth gear 155 via the second primary shaft 142. As such, in FIG. 7B the electric drive clutch 173 is engaged. Conversely, in FIG. 7C the electric drive clutch 173 is disengaged, the clutch 170 is engaged with the fourth gear 155, and the clutches 171, 172, 174 are disengaged.

Further, in FIG. 7C, power is transferred from the electric machine 108 to the fourth gear 155 and from the fourth gear to the secondary shaft 146. From the secondary shaft 146, the power is split and transferred to both the drop gear 127 and the seventh gear 152. Next the power path travels to the first primary shaft 140 and then to the dual-clutch assembly 118 via the first clutch mechanism 143. In this way, the ICE may be cranked using different gear ratios. Thus, in FIG. 7C the clutch 174 is engaged with the gear 163, the clutch 170 is engaged with the fourth gear 155, and the clutches 171, 172, 173 are disengaged. Further it will be understood that other gears or gear combinations may be used to crank the ICE 110.

FIGS. 8A-8D depict the transmission system 104 operating in an EV mode while in different operating gears (i.e., the second gear, the fourth gear, the sixth gear, and the eighth gear). Power paths 800, 802, 804, and 806 are shown in FIGS. 8A-8D, respectively. It will be understood that in the EV mode, the ICE 110 may be shut down and/or decoupled from the dual-clutch assembly 118 and the electric machine 108 is generating mechanical power. In the EV mode, the power paths may either bypass or travel through the secondary shaft 146 depending on performance targets, allowing the system's performance to be fine-tuned depending on vehicle operating conditions, for instance. Further, in other kinematic transmission layouts, such as those shown in FIGS. 17-18, the electric machine may be operated in the odd gears during the EV mode due to the ability of these transmissions to link the inner and outer primary shafts.

Figures 8A, 8B, 8C, 8D:
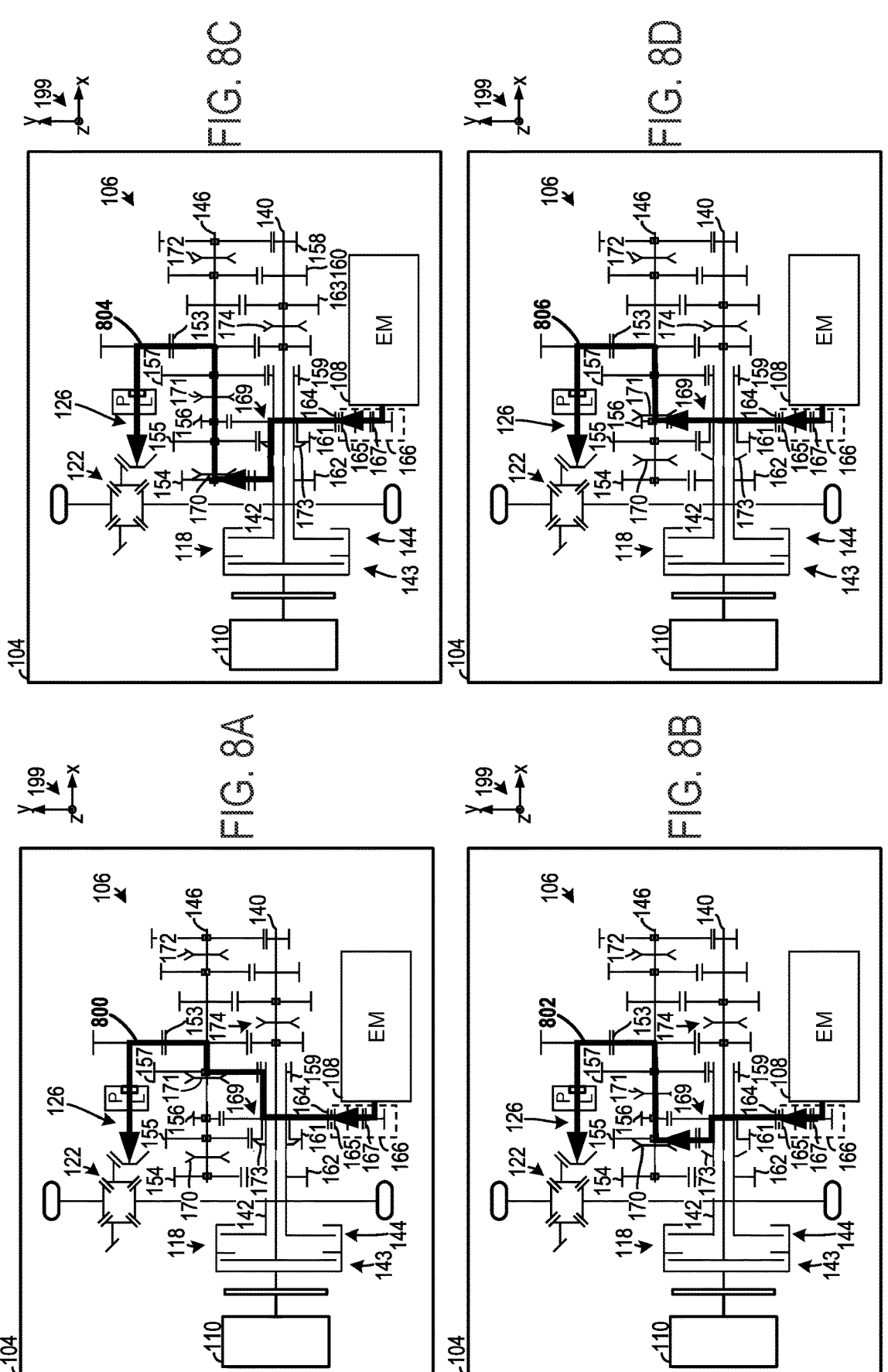
FIGS. 8A-8D show mechanical power paths that occur in the transmission, depicted in FIG. 1, while the transmission is operating in an electric vehicle (EV) mode.

FIG. 8A shows the transmission system 104 in the second gear 157 where the clutch 171 engages the second gear 157, the electric drive clutch 173 is engaged, and the remainder of the clutches are disengaged. The second gear EV mode may be used when comparatively high torque is desired while the vehicle is on a slope or off the line acceleration.

FIG. 8B shows the transmission system 104 in the fourth gear 155 where the clutch 170 engages said gear and the remainder of the clutches are disengaged. In the fourth gear, the power path from the electric machine 108 bypasses the second primary shaft 142 and flows to the secondary shaft 146. The fourth gear EV mode may be implemented when higher driveline system efficiency is wanted.

FIG. 8C shows the transmission system 104 in the sixth gear 154 where the clutch 170 engages said gear, the electric drive clutch 173 is engaged, and the remainder of the clutches are disengaged. As such, in the sixth gear EV mode, the power path 806 travels from the electric drive interface gear 164 to the second primary shaft 142 and then to the sixth gear 154.

FIG. 8D shows the transmission system 104 in the eighth gear 156 where the clutch 171 engages said gear and the remainder of the clutches are disengaged. The eighth gear EV mode may be implemented when higher motor efficiency is wanted. In the eighth and fourth gear EV modes, the system may function similarly to a P3 hybrid drive system. The transmission system may shift between the second gear, the fourth gear, the sixth gear, and the eighth gear by disengaging the clutch associated with the current operating gear while engaging the clutch corresponding to the desired (e.g., selected) operating gear. The electric drive clutch 173 may also be engaged to allow power to be transferred to the second primary shaft in the second gear and the sixth gear and disengaged to allow power to bypass the second primary shaft in the fourth gear and the eighth gear.

Figures 9A, 9B:
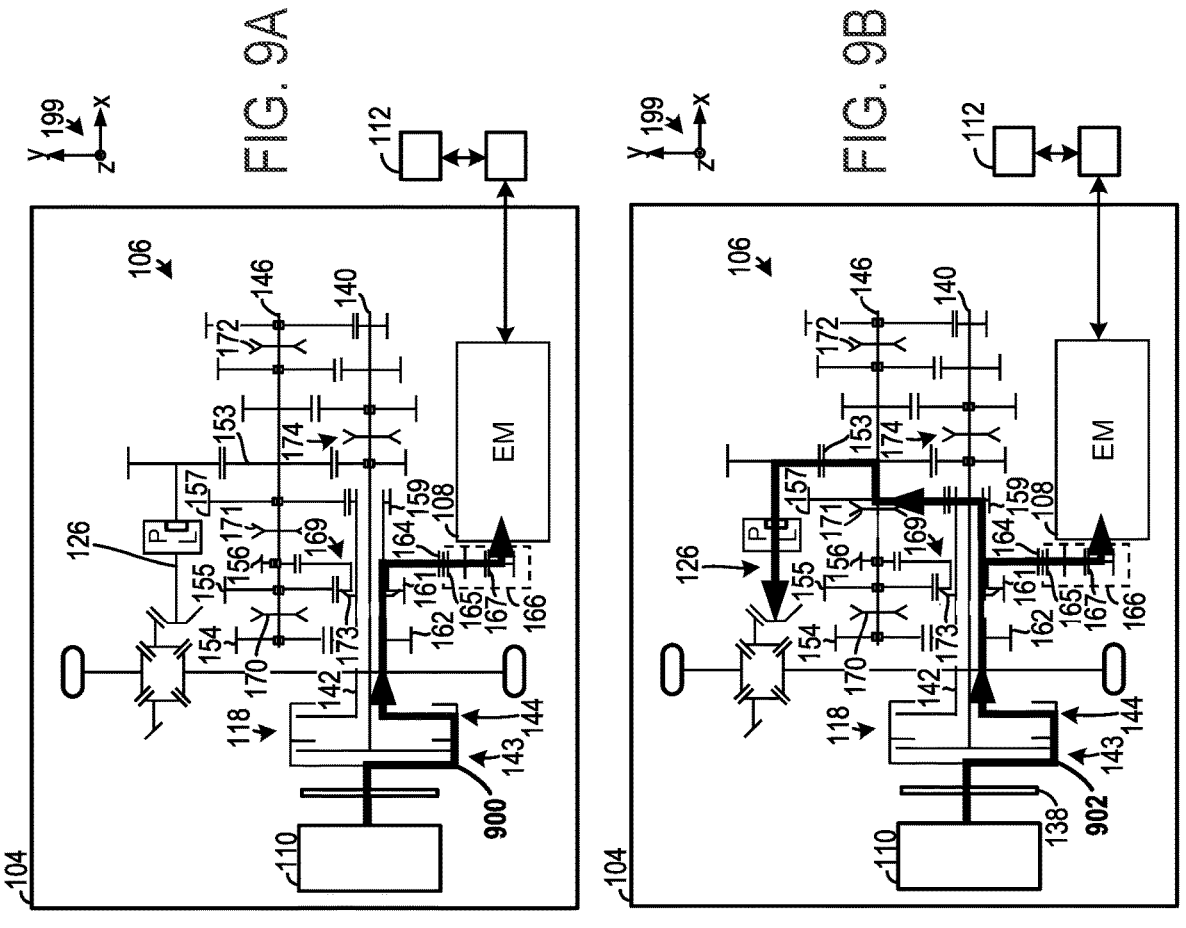
FIGS. 9A-9B show mechanical power paths that occur in the transmission system, depicted in FIG. 1, in different energy storage device charging modes.
Figures 10A, 10B, 10C, 10D:
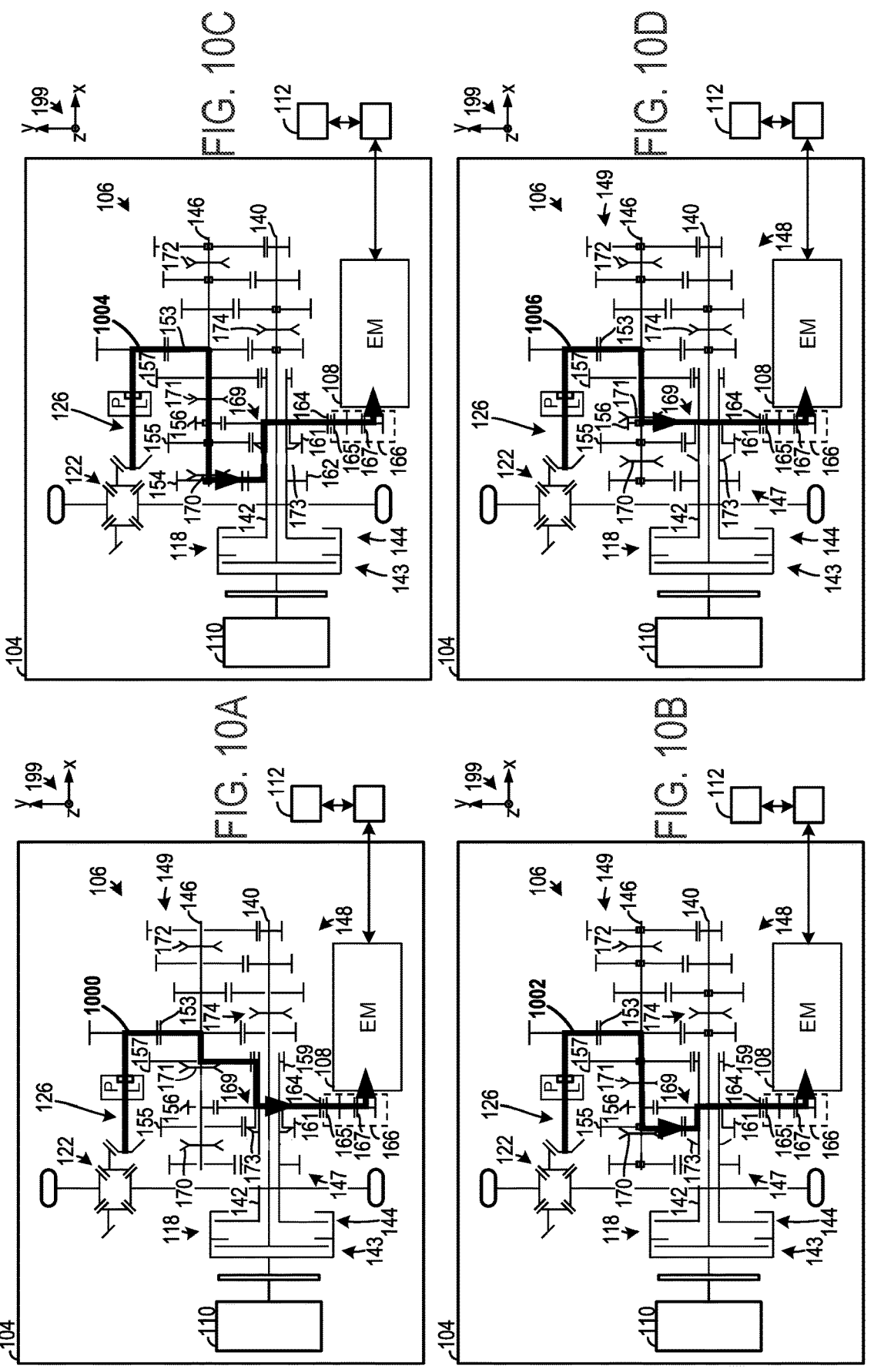
FIGS. 10A-10D show mechanical power paths that occur in the transmission system, depicted in FIG. 1, in different energy kinetic energy recovery modes.

FIGS. 9A-9B show the transmission system 104 operating in an energy storage device (e.g., battery) charging mode while the vehicle is at standstill and while the vehicle is in motion, respectively. Therefore, in the charging mode, the ICE 110 is operational and the electric machine 108 generates electrical energy and transfers said energy to the energy storage device 112.

In the system configuration shown in FIG. 9A, the electric drive clutch 173 is engaged with the double gear unit 169 while the remainder of the clutches in the system are engaged. Specifically, FIG. 9A shows a charging power path 900 which travels from the ICE 110 to the first primary shaft 140 via the dual-clutch assembly 118 and then to the electric machine 108 by way of the electric drive interface gear 164 and the electric machine gear set 166.

In the transmission system configuration shown in FIG. 9B, the electric drive clutch 173 is engaged and the clutch 171 engages the second gear 157 while the remainder of the clutches are disengaged. The charging power path 902 therefore travels along the first primary shaft 140 and splits, with one branch traveling to the electric machine 108 and the other branch traveling to the second gear 157. It will be understood, that the electric machine may charge the energy storage device in a similar manner while the system is operating in the other evenly numbered gears (i.e., the fourth gear, the sixth gear, or the eighth gear).

FIGS. 10A-10D show the transmission system 104 operating in a kinetic energy recovery mode where power travels from the output shaft 126 to the electric machine 108 for electrical energy generation, for example during braking. As such, in the kinetic energy recovery mode the ICE 110 is shut down and/or otherwise decoupled, and/or coupled with the gearbox but is driven by the output tires (in coasting or sailing, for example), from the gearbox and the electric machine 108 is generating electrical energy. The power paths 1000, 1002, 1004, and 1006 shown in FIGS. 10A-10D are similar to the power paths 800, 802, 804, and 806 shown in FIGS. 8A-8D except reversed. Therefore, redundant description is omitted for brevity.

FIGS. 2A-10D provide for transmission operating methods that allow the transmission to be operated in a hybrid mode, an EV mode, an energy storage device charging mode, a kinetic energy recovery mode, and an ICE cranking mode. In the hybrid mode, the method may include operating the system in any of the aforementioned gears (e.g., first gear through eighth gear) as well as transitioning between any of two operating gears via an upshifting or downshifting operation. To shift between the gears, a gear clutch on the primary shafts and/or the secondary shaft may be engaged with a preselected gear. Next, during the shifting transient, a powershift or a seamless shift may be performed where one of the clutch mechanisms in the dual-clutch assembly is disengaged while the other clutch mechanism is engaged. The method may further include steps where power is transferred between the system components to achieve any of the power paths described with regard to FIGS. 2A-2H and 4A-10D.

Further, in at least a portion of the system's operating gears, the electric machine may drive a different gear than the ICE, if wanted. The gear driven by the electric machine in these operating gears may be switched based on system operating conditions, torque demands, desired system efficiency, and also depending on the vehicle set-up such as track mode, comfort mode, eco mode, and the like.

Figures 11, 12:
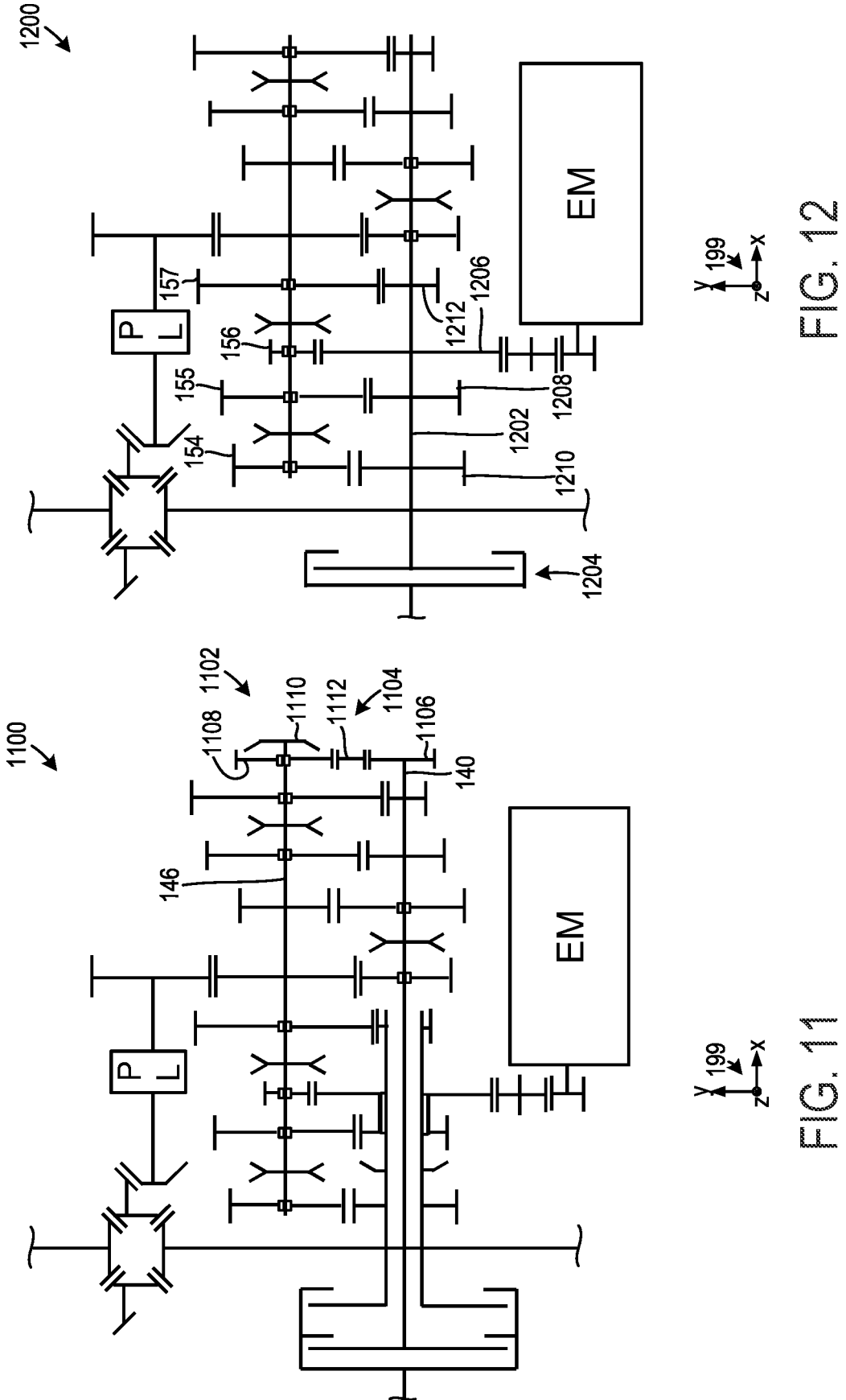

FIG. 11 shows another example of a transmission system 1100 that may include some components that are similar to the transmission system 104 depicted in FIG. 1. Redundant description of the overlapping components in the transmission systems shown in FIG. 1 as well as 3, 12-19 and 27 is omitted for concision.

The transmission system 1100 shown in FIG. 11 includes a mechanical reverse assembly 1102 that is coupled to the first primary shaft 140 and the secondary shaft 146. Further, the transmission system 1100 may again be a dual-clutch transmission. To elaborate, the mechanical reverse assembly 1102 include a reverse gear set 1104 with a gear 1106 coupled to first primary shaft 140, a gear 1108 idly coupled to the secondary shaft 146 when a reverse clutch 1110 is disengaged, and a gear 1112 that meshes with the gears 1106, 1108. The reverse clutch 1110 is designed to couple the gear 1108 to the secondary shaft 146 for rotation therewith when engaged. Conversely, when the reverse clutch is disengaged, the gear 1108 is allowed to independently rotate with regard to the secondary shaft 146. In this way, the transmission system 1100 may be selectively placed in a reverse drive mode when desired.

FIG. 12 shows yet another example of a transmission system 1200. The transmission system 1200 includes a single primary shaft 1202 and ICE clutch 1204 that is designed to selectively engage the primary shaft for rotation with the ICE. Thus, the transmission system 1200 may be an automated manual transmission. Further, the electric drive interface gear 1206 is fixedly coupled to the primary shaft 1202 and meshes with the eighth gear 156. Further, the gear 1208 is fixedly coupled to the primary shaft 1202 and meshes with the fourth gear 155. Even further, the gear 1210 is fixedly coupled to the primary shaft 1202 and meshes with the sixth gear 154 and the gear 1212 is fixedly coupled to the primary shaft and meshes with the second gear 157. The layout of the clutches and the remainder of the gears in the transmission system 1200 is similar to the transmission system 104, shown in FIG. 1.

Figures 13, 14:
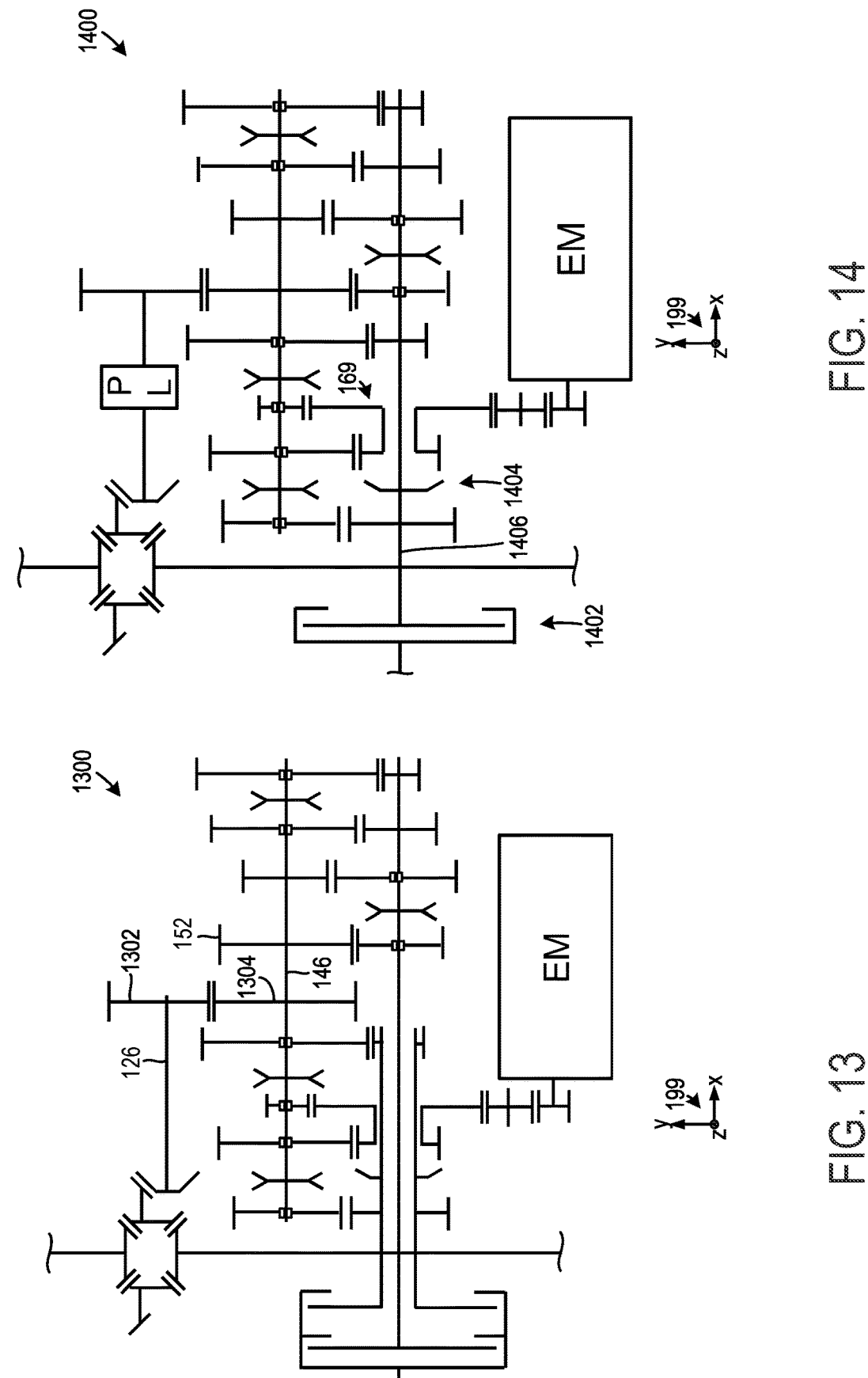

FIG. 13 shows yet another example of a transmission system 1300 with an independent drop gear 1302 that is fixedly coupled to the output shaft 126. The transmission system 1300 may again be a dual-clutch type transmission. The drop gear 1302 meshes with the gear 1304 that is fixedly coupled to the secondary shaft 146. Thus, in the transmission system 1300 the gear 1304 is separate from the fifth gear 152. Therefore, the transmission system 1300 has a longer axial length and greater weight when compared to the transmission system 104, shown in FIG. 1. However, the gear ratios may be easier to adjust in the transmission system 1300. Further, the park lock assembly has been omitted from the transmission system 1300. However, the park lock assembly may be an optional feature in any of the transmission systems described herein.

FIG. 14 shows another example of a transmission system 1400 with a single ICE clutch 1402 and an electric drive clutch 1404 that is designed to engage and disengage the double gear unit 169 from the primary shaft 1406. In this layout the torque fill capability from the electric motor during gearshifts may be desired for shifting smoothness. Using the electric drive clutch in this automated manual transmission allows the efficiency of the system's EV mode to be increased when compared to the single clutch transmission system shown in FIG. 12.

Figure 15:
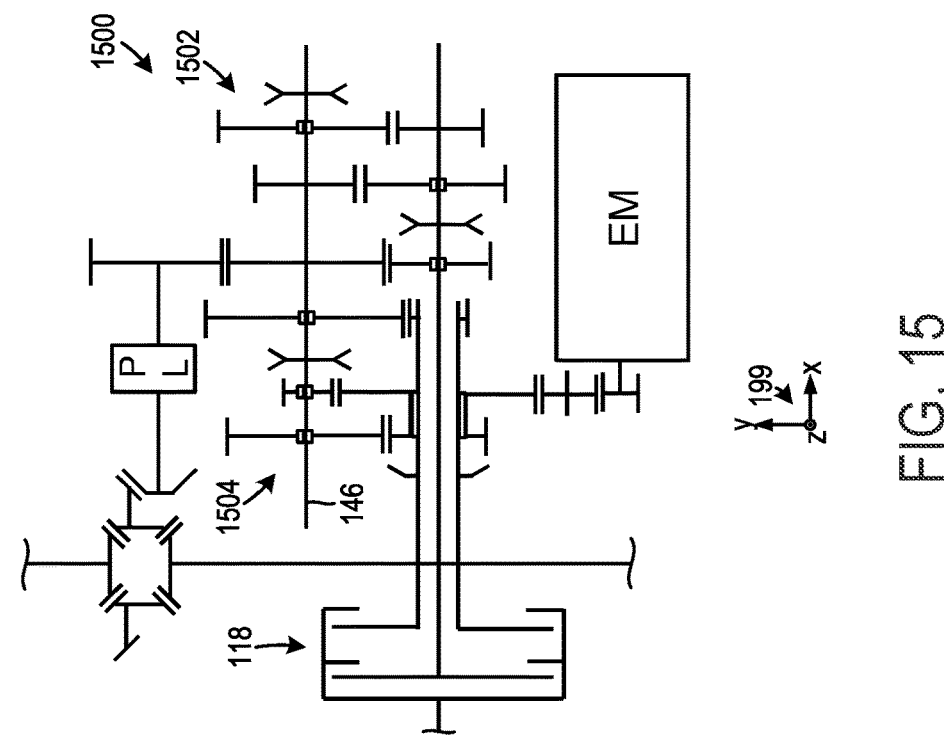

FIG. 15 shows yet another example of a transmission system 1500. The transmission system 1500 is designed as a six speed transmission with the dual-clutch assembly 118. In the illustrated example, the transmission system 1500 includes three odd gears 1502 and three even gears 1504 coupled to (e.g., idly or fixedly coupled to) the secondary shaft 146. In this way, the transmission may be efficiently reconfigured with six gear as opposed to the eight gear transmission layout, shown in FIG. 1.

Figure 16:
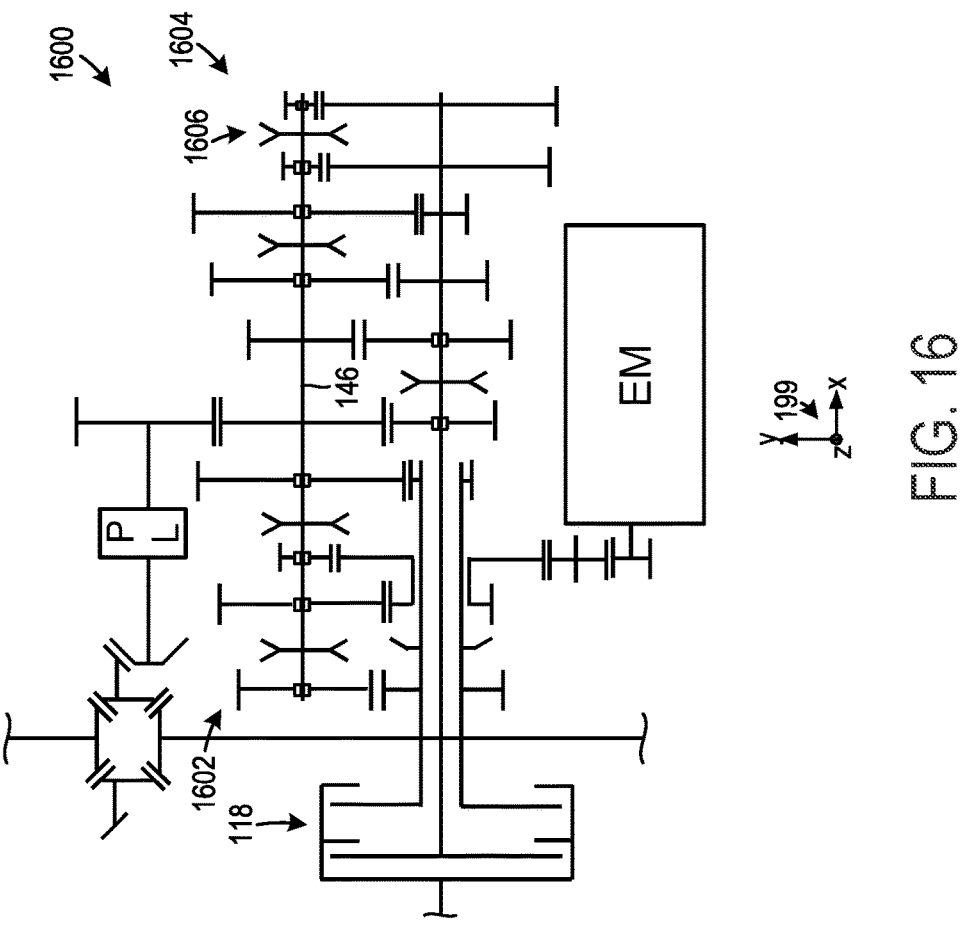

FIG. 16 shows even another example of a transmission system 1600 that again includes a dual-clutch assembly 118 but has ten gears. As such, five even numbered gears 1602 and five odd numbered gears 1604 are mounted on (e.g., idly or fixedly coupled to) the secondary shaft 146. The transmission system 1600 may further include clutch 1606 that allows the transmission to shift between the two additional odd gears, when compared to the previously described eight speed transmission. The ten speed transmission system 1600 has increased top speed and fuel economy when compared to the six and eight speed transmissions but also increases the length of the first primary shaft (e.g., the odd gear shaft).

Figures 17, 18:
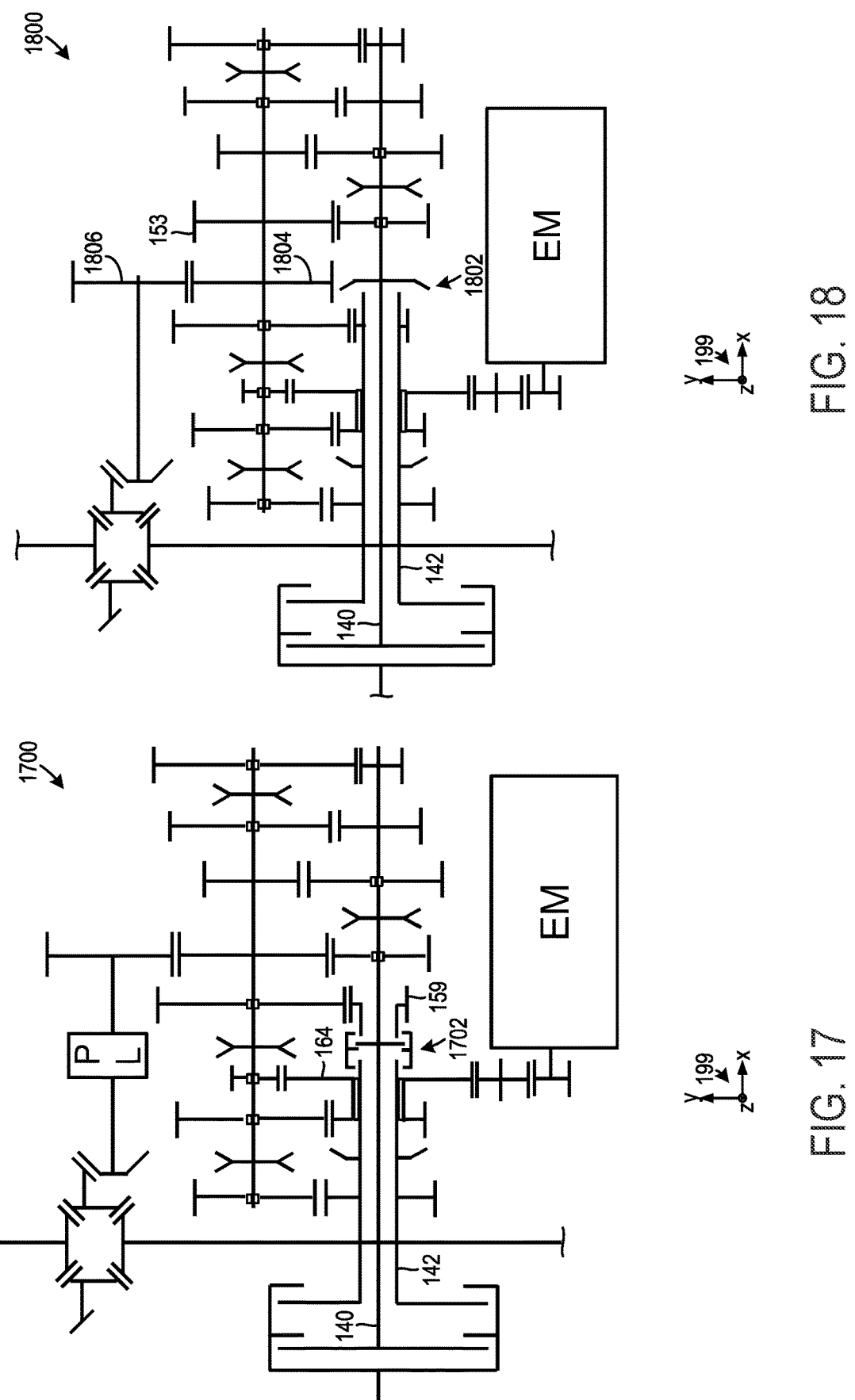

FIG. 17 shows yet another example of a transmission system 1700 with a clutch 1702 (e.g., a dog clutch) designed to selectively engage the second primary shaft 142 with the first primary shaft 140. The clutch 1702 may be positioned along the second primary shaft 142 at a location axially between the electric drive interface gear 164 and the gear 159. The clutch 1702 is designed to selectively couple the second primary shaft with the first primary shaft while the gear 159 may be fixedly connected to the second primary shaft. In this way, the electric machine 108 can be connected to the odd gears on the secondary shaft. Consequently, in the EV mode, pull away performance can be increased and enhanced gradeability, if desired. However, adding the clutch 1702 to the system may increase the axial length of the transmission and increase the number of components and weight of the system. Adding the clutch 1702 may also increase the likelihood of component degradation, in certain cases.

FIG. 18 shows another example of a transmission system 1800. The transmission system 1800 includes a clutch 1802 (e.g., a synchronizer). The clutch 1802 is designed to selectively engage the second primary shaft 142 and the first primary shaft 140. Again, the system 1800 may include a gear 1804 that meshes with the drop gear 1806 and is independent from the fifth gear 153. Adding the clutch 1802 may again increase EV launch performance, in comparison to the dual-clutch layouts described herein that do not have the ability to selectively couple and decouple the first and second primary shafts 140, 142. However, it will be appreciated that the clutch 1802 may be disengaged during certain conditions such as in at least some hybrid mode to avoid a situation where the ICE is driving both and odd and even gear.

Figures 19, 27:
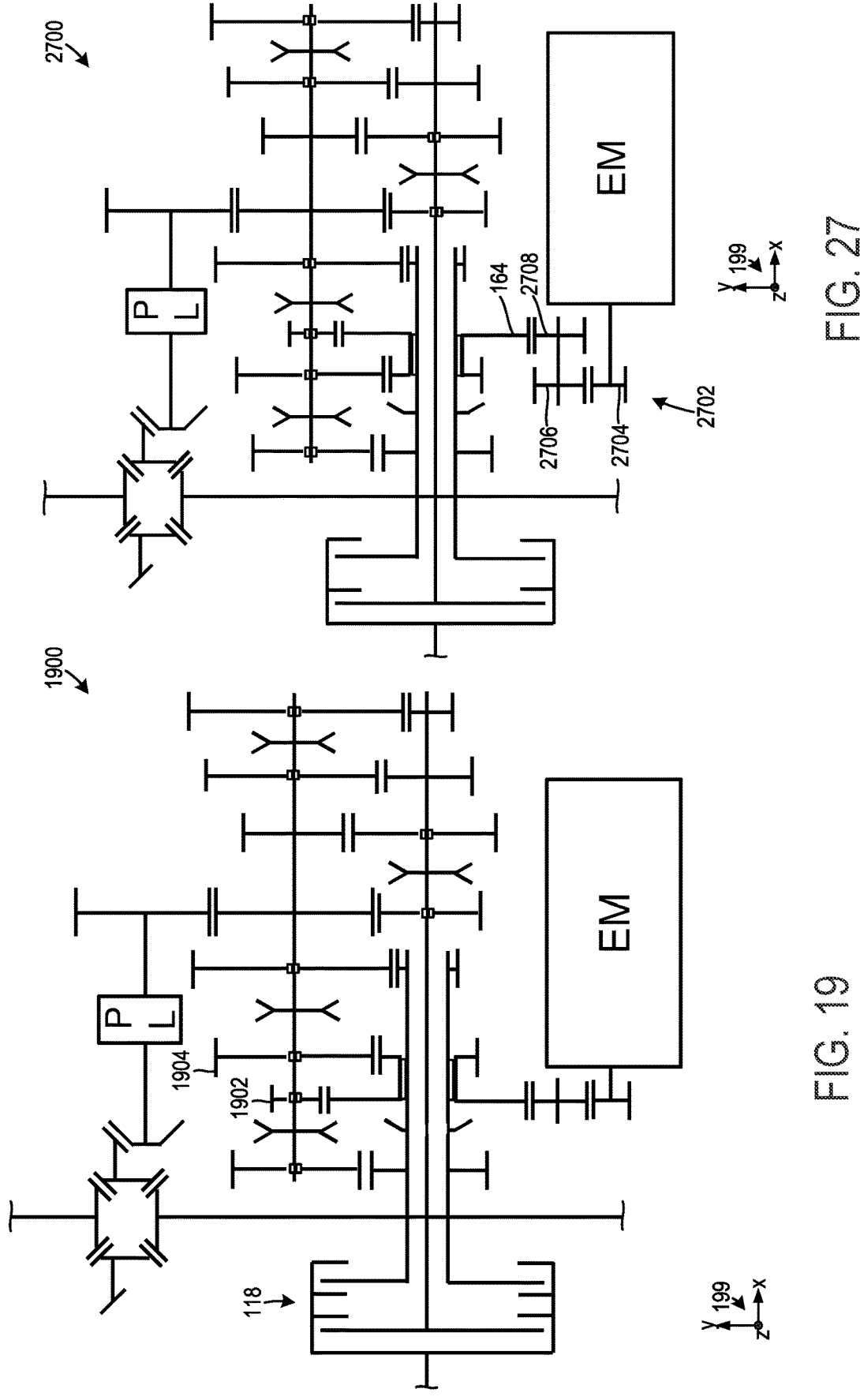

FIG. 19 shows another example of a transmission system 1900 that again includes a dual-clutch assembly 118. However, in the transmission layout shown in FIG. 19 the position of the eight gear 1902 and the fourth gear 1904 are swapped in relation to the transmission system 104 shown in FIG. 1.

Figures 3, 22:
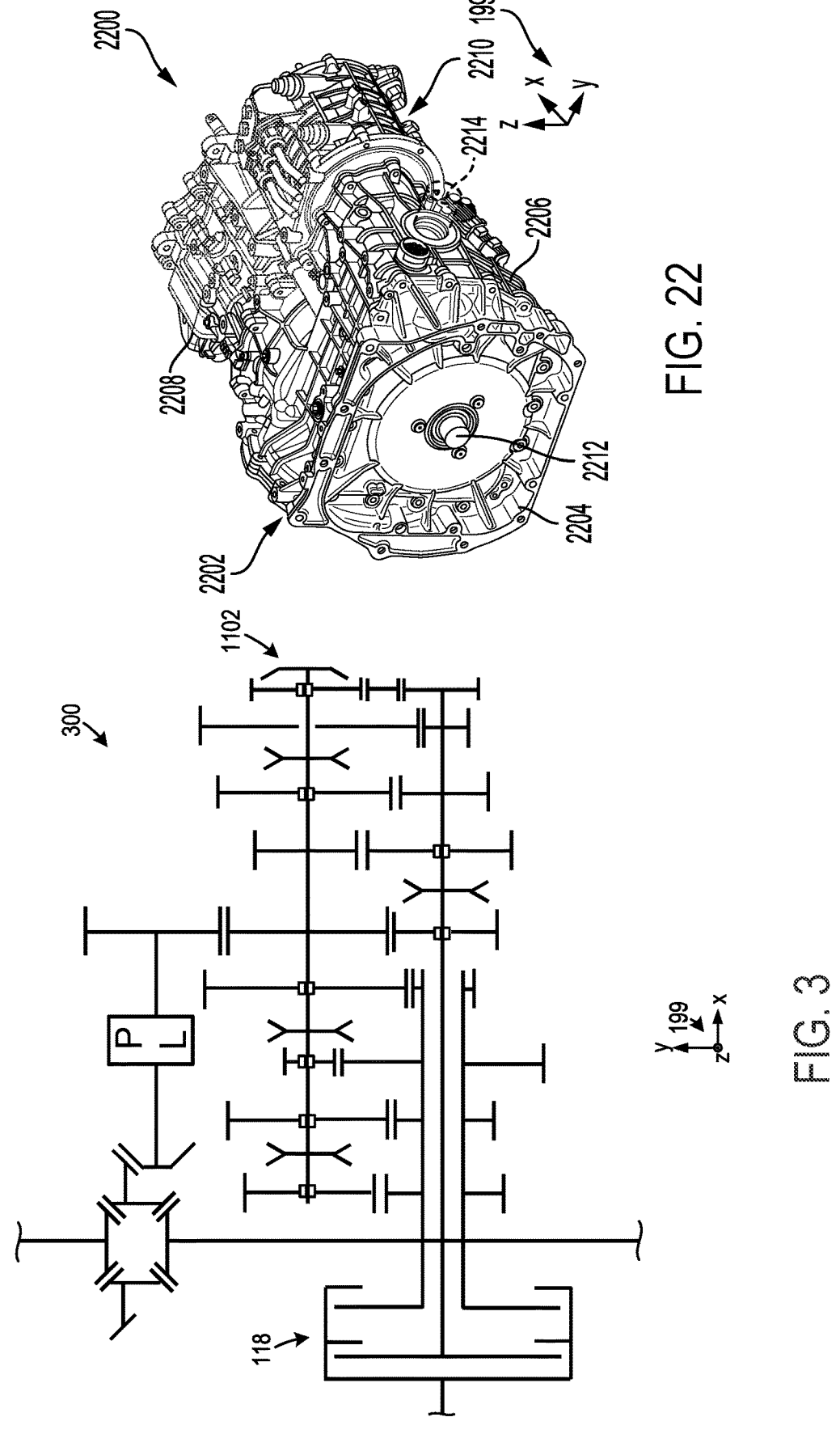
FIGS. 3, 11-19, and 27 show other exemplary transmission system architectures.
FIG. 22 shows a perspective view of an exemplary transmission system within a housing.

FIG. 3 shows another example of a transmission system 300 again with the dual-clutch assembly 118 and the mechanical reverse assembly 1102. However, the electric machine has been omitted in the transmission system 300 depicted in FIG. 3.

FIG. 27 shows yet another example of a transmission system 2700. The system again has a dual-clutch arrangement but the electric machine gear set 2702 is altered in comparison to the transmission system 104 shown in FIG. 1. Specifically, the electric machine gear set 2702 includes a first gear 2704 on the electric machine's output shaft, a second gear 2706 that meshes with the first gear, and a third gear 2708 that meshes with the electric drive interface gear 164. This electric machine gear set arrangement can increase the flexibility for the gear ratio between the electric machine and second primary shaft when compared to the electric machine gear set 166 shown in FIG. 1 but may also increase system weight.

Figure 20:
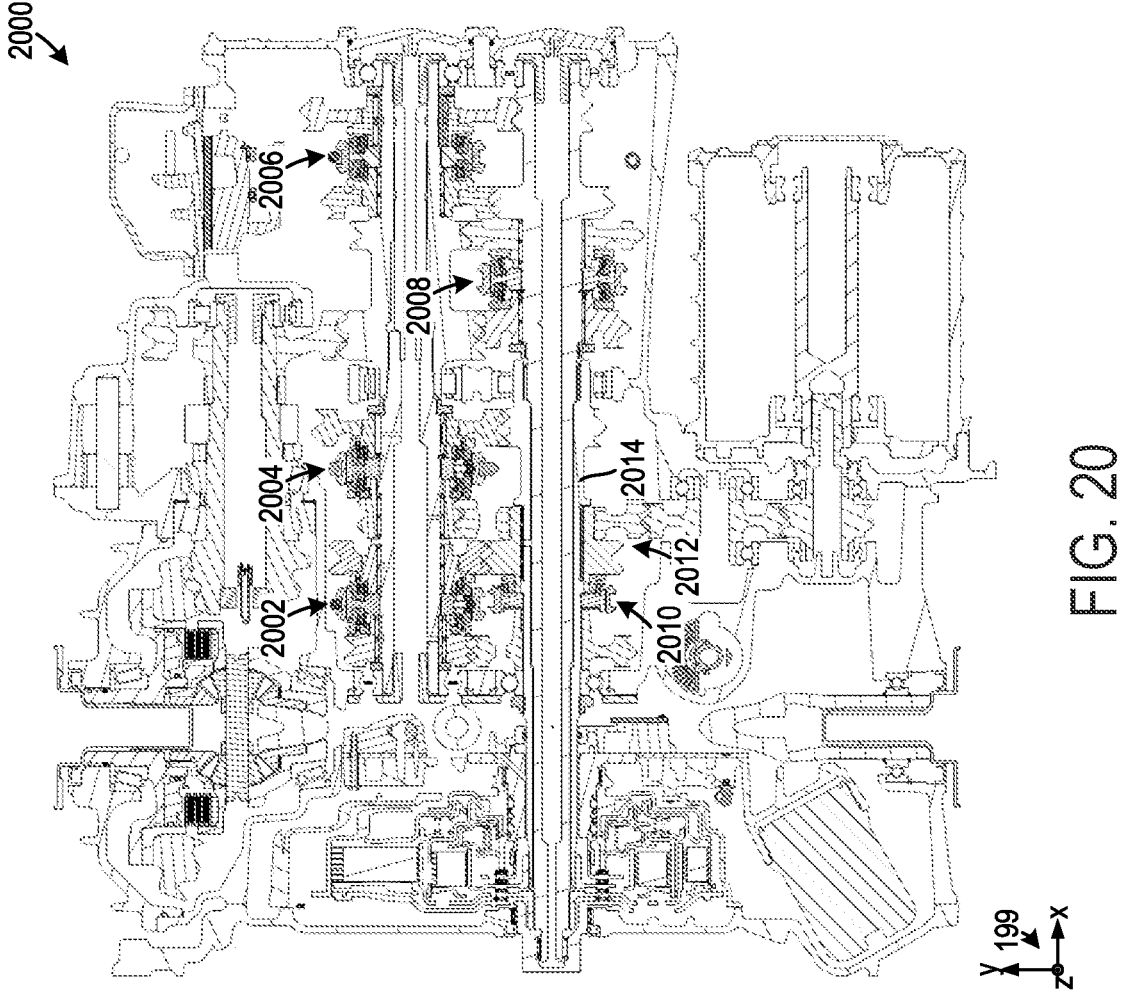
FIG. 20 shows a detailed cross-sectional view of an example of a transmission system.

FIG. 20 shows a cross-sectional view of a detailed illustration of a transmission system 2000. The transmission system 2000 may have a similar layout with regard to gearing and clutches as the transmission system 104, shown in FIG. 1. Gear clutches 2002, 2004, 2006, and 2008 in the gearbox are depicted. Further, the electric drive clutch 2010 is further depicted in FIG. 20 that selectively engages the double gear 2012 with the second primary shaft 2014.

Figure 21:
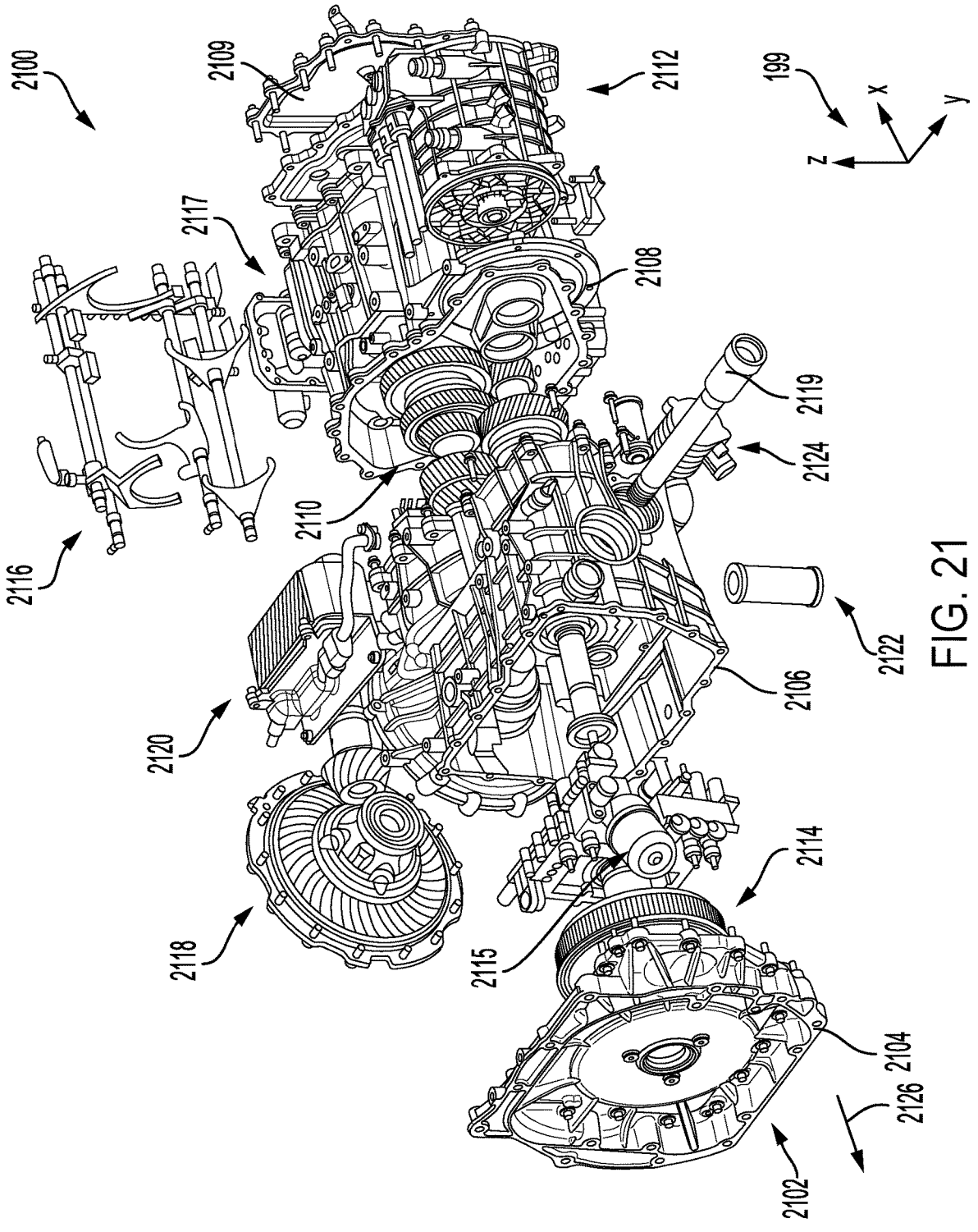
FIG. 21 shows an exploded view of an exemplary transmission system.

FIG. 21 shows an exploded view of an exemplary transmission system 2100 that has a gearing and clutch architecture similar to the transmission system 104, shown in FIG. 1. The transmission system 2100 includes a housing 2102 with sections 2104, 2106, 2108, and 2109. The housing section 2106 may be contoured to at least partially enclose at least a portion of the gearbox components 2110 such as the primary shafts, the secondary shaft, the clutches, and the gears residing on the shafts. An electric machine 2112 is shown coupled to the housing section 2108. Further, the housing section 2104 may be contoured to enclose the dual-clutch assembly 2114. A clutch control valve module 2115 that is designed to actuate the dual-clutch assembly to induce engagement of both clutch mechanisms is further illustrated in FIG. 21. The clutch control valve 2115 may be a hydraulic/mechatronic module, in one example. Further a platform approach may be used for the retaining strategy of the transmission to the vehicle, for example the transmission mount may be on the housing 2108 (e.g., a geartrain housing) or a central transmission mount on the housing 2106 (e.g., a clutch housing). Additionally, a shifting system 2116 for actuation of the clutches (e.g., synchronizers, dog clutches, sliding sleeve clutches, and the like) in the gearbox is also depicted in FIG. 21. A shifting actuation valve module 2117 is further illustrated in FIG. 21. The shifting system 2116 may include shift forks and rods, for example. However, other suitable shifting system components may be used, in other examples.

A differential 2118 as well as a differential shaft 2119 is further depicted in FIG. 21. The differential 2118 may be an electronic limited slip differential which increases the vehicle's traction performance and vehicle dynamics through a corner, in one example. However, other suitable types of differentials have been contemplated. Additionally, a cooler 2120, filters 2122, and a pump 2124 are further shown in FIG. 21. However, other transmission system configurations may be used, alternate examples. Arrow 2126 indicates the drive direction of the vehicle. Further, the transmission may be cooled via a dedicated cooler 2120, transmission mounted, or an air to oil radiator, vehicle mounted or other cooling systems. In this way, the system's performance may be further increased, if desired.

FIG. 22 show the housing 2202 with sections 2204, 2206, and 2208. An electric machine 2210 is coupled to the housing section 2208.

FIG. 22 further shows the transmission system 2200 with a housing 2202 that has sections 2204, 2206, and 2208. The housing section 2206 may at least partially enclose the primary shafts, the secondary shaft, and the output shaft of the transmission and the corresponding gears and clutches. A shaft 2212 that serves as an interface for the flywheel is further shown in FIG. 22. Axle shafts (referred to as drive-shafts, in some instances) 2214 are further illustrated in FIG. 22.

Figures 23, 24, 25, 26:
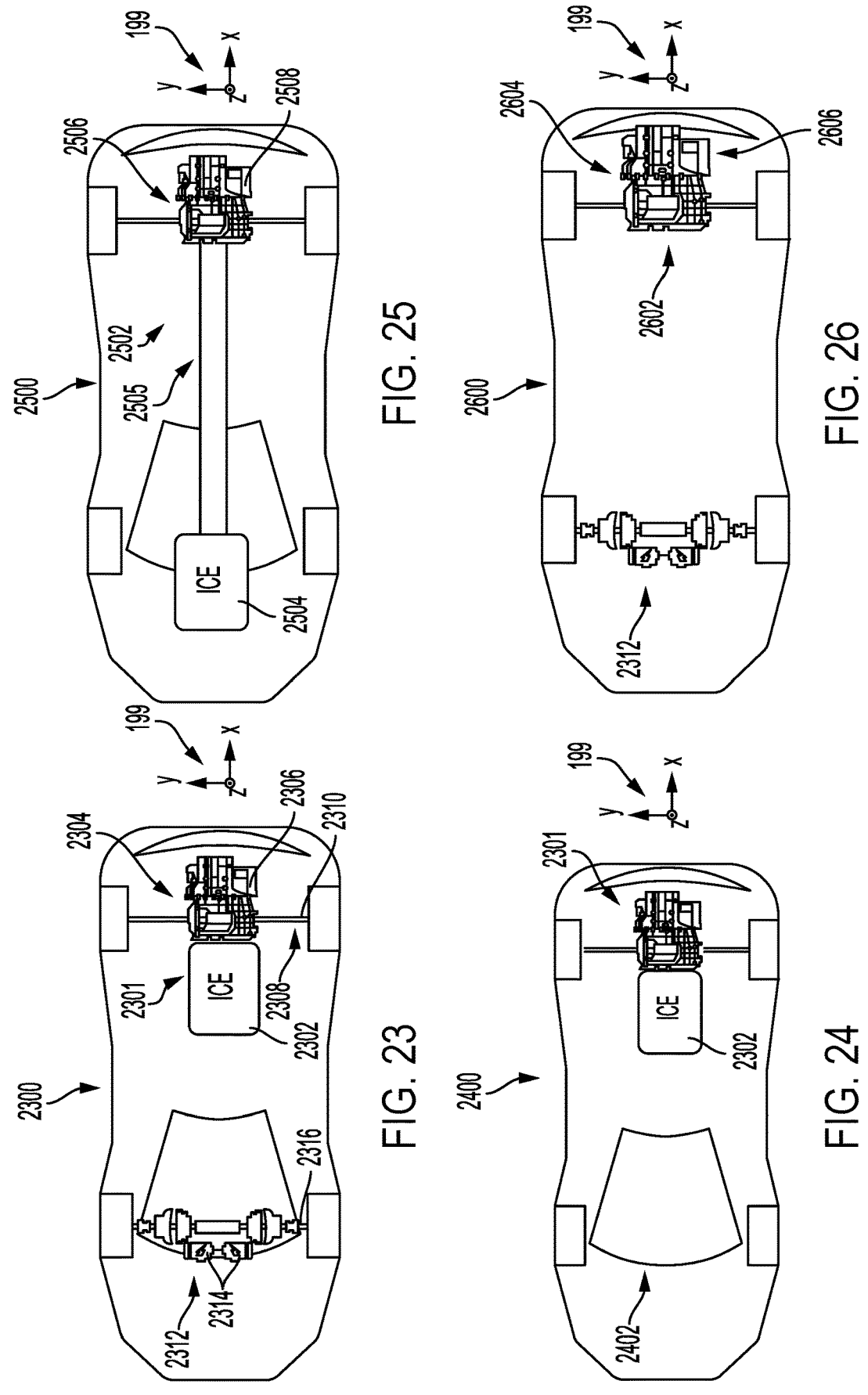
FIGS. 23-26 show exemplary vehicles with different electric drive mounting positions.

FIGS. 23-26 show vehicles 2300, 2400, 2500, and 2600 respectively, with different front axle, engine, and electric drive configurations. Specifically, as shown in FIG. 23, the all-wheel drive vehicle 2300 has a transmission system 2301 with an ICE (or other suitable engine) 2302, gearbox 2304, and electric machine 2306 configured to provide power to a rear axle 2308 that includes axle shafts (referred to as driveshafts, in some instances) 2310. The ICE 2302 is shown mounted near the middle of the vehicle, although other engine positions have been contemplated.

The transmission system 2301 may have a layout that is similar to the dual-clutch transmission system 104, shown in FIG. 1, in one embodiment. However, in alternate embodiments, the transmission system 2301 may have a layout similar to any of the transmission systems shown in FIGS. 11-19. The vehicle 2300 further includes a steerable front electric axle assembly 2312 that includes electric machines 2314 that drive opposing axle shafts 2316. When, the front axle is operational and the transmission system 2301 is in neutral, losses in the transmission system are reduced when compared to P2 style hybrid transmissions. For instance, when the transmission system is in neutral and the wheels transfer torque to the gearbox (during a coast or sailing condition, for example), the output shaft, the secondary shaft, and a portion of the gears that are coaxial to the primary shafts rotate. However, the first and second primary shafts do not rotate when the transmission system in neutral, thereby increasing powertrain efficiency and reducing coast down on the rear axle.

FIG. 24 shows the rear wheel drive vehicle 2400 which again includes the transmission system 2301 but the steerable front axle 2402 does not include and electric drive unit. Omitting the front electric drive unit decreases the system's weight and complexity as well as the likelihood of front axle component degradation. The vehicle 2400 again has a mid-engine mounting position for the ICE 2302.

FIG. 25 shows the rear wheel drive vehicle 2500 with a transmission system 2502 where the ICE 2504 is mounted in the front of the vehicle and a drive shaft 2505 and/or other suitable mechanical components provide rotational coupling between the ICE 2504 and the multi-speed gearbox 2506 that has an electric machine 2508. In this way, the engine may be front mounted which may provide a desired weight distribution in the vehicle for certain vehicle platforms.

FIG. 26 shows yet another vehicle 2600 that includes the steerable front electric axle assembly 2312 as well as an electric rear axle assembly 2602 that includes a gearbox 2604 and an electric machine 2606.

FIGS. 1-27 provide for a vehicle product line that may include two or more of the transmission systems described herein. For instance, the vehicle product line may include the transmission system 104, shown in FIG. 1, as well as a first transmission system and any of the transmission systems shown in FIGS. 11-19 and 27, as a second transmission system. The two transmission systems included in the product line may share a common number of operating gears. In this way, these transmission systems may be more efficiently manufactured and developed. The bearing layout and types of bearings of at least a portion of the bearings in the two transmission systems may also be similar, which may allow further gains in manufacturing and development efficiency. In the two transmission systems in the product line, the clutch layout, particularly on the secondary shaft, may be similar, in one example, to further decrease manufacturing costs. Further in certain examples, the two transmissions may have housing sections that have an equivalent size and shape to further simplify transmission manufacturing. As such, the housing sections in both transmissions may enclose separate sets of gears.

FIGS. 20-22 are drawn approximately to scale, although other relative dimensions between the components may be used, in other embodiments.

FIGS. 1-2H and 2J-27 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Even further, elements that are coaxial or offset from one another may be referred to as such. Still further, a component that is fixedly coupled for rotation with another component may be referred to as such. Components arranged parallel, coaxial, or perpendicular to one another may be referred to as such.

FIGS. 1-2H and 2J-27 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Even further, elements that are coaxial or offset from one another may be referred to as such. Still further, a component that is fixedly coupled for rotation with another component may be referred to as such. Components arranged parallel, coaxial, or perpendicular to one another may be referred to as such.

The invention will be further described in the following paragraphs. In one aspect, a hybrid transmission system is provided that includes a multi-speed gearbox including a first primary shaft with a first set of gears positioned thereon and selectively coupled to an internal combustion engine (ICE) at a first end; a second primary shaft with a second set of gears positioned thereon; a secondary shaft with a third set of gears that mesh with the first set of gear and the second set of gears; an electric drive interface gear that is idly mounted, free to spin, on the second primary shaft and positioned between two gears in the second set of gears; and an output shaft that includes: a first output shaft gear which is fixedly coupled thereto meshes with a gear on a secondary shaft; and a second output shaft gear which meshes with a bevel gear in a differential that is positioned perpendicular to the electric machine.

In another aspect, a vehicle product line is provided that includes a first transmission system comprising: a first set of gears coupled to a first primary shaft; and a second set of gears coupled to a first secondary shaft and forming a first group of gear combinations with the first set of gears; and a second transmission system comprising: a third set of gears coupled to a second primary shaft; and a fourth set of gears coupled to a second secondary shaft and forming a second group of gear combinations with the third set of gears, wherein the first and second groups of gear combinations have an equivalent number of gear combinations.

In any of the aspects or combinations of the aspects, the hybrid transmission system may further include an electric drive clutch designed to operate in: an engaged position where mechanical power is transferred from the electric machine to a gear in the second set of gears via the electric drive interface gear; and a disengaged position where mechanical power is transferred from the electric machine to a gear in the third set of gears via the electric drive interface gear.

In any of the aspects or combinations of the aspects, the electric drive clutch and a gear clutch are arranged in a similar axial position along the second primary shaft and the secondary shaft, respectively and wherein the gear clutch is coupled to the secondary shaft and selectively coupled to a gear in the third set of gears.

In any of the aspects or combinations of the aspects, the electric drive clutch is a synchronizer, a dog clutch, or a sliding sleeve clutch.

In any of the aspects or combinations of the aspects, the hybrid transmission system may further include a dual-clutch assembly designed to selectively couple the ICE to the first primary shaft and a second primary shaft.

In any of the aspects or combinations of the aspects, the multi-speed gearbox further comprising a gear clutch coupled to the secondary shaft and designed to selectively engage a gear that is idly mounted to the secondary shaft and meshes with the electric drive interface gear.

In any of the aspects or combinations of the aspects, the electric drive interface gear may be included in a dual gear unit with a second gear that meshes with a gear in the third set of gears.

In any of the aspects or combinations of the aspects, the hybrid transmission system may further include further a mechanical reverse assembly coupled to the secondary shaft, wherein the mechanical reverse assembly comprises: a reverse clutch and a reverse gear set configured to selectively rotationally couple the reverse gear set to the first primary shaft and the secondary shaft.

In any of the aspects or combinations of the aspects, the transmission system may further include a park lock assembly coupled to an output shaft that is coupled to a differential.

In any of the aspects or combinations of the aspects, the multi-speed gearbox may include four or more operating gear ratios.

In any of the aspects or combinations of the aspects, the hybrid transmission system may be a transaxle.

In any of the aspects or combinations of the aspects, the first transmission system may be an automatic dual-clutch hybrid transmission that includes a first dual-clutch assembly coupled to a first internal combustion engine (ICE) and selectively coupled to the first primary shaft.

In any of the aspects or combinations of the aspects, the second transmission system may be an automatic dual-clutch ICE transmission system that includes a second dual-clutch assembly coupled to a second ICE and selectively coupled to the second primary shaft.

In any of the aspects or combinations of the aspects, the first transmission system may be an automated manual transmission system that may include a clutch coupled to an ICE and selectively coupled to the first primary shaft.

In any of the aspects or combinations of the aspects, the first transmission system may be an automatic dual-clutch hybrid transmission system that includes a first dual-clutch assembly coupled to a first ICE and selectively coupled to the first primary shaft and the second transmission system is an automated manual transmission system that includes a clutch coupled to a second ICE and selectively coupled to the first primary shaft.

In any of the aspects or combinations of the aspects, the first and second groups of gear combinations may have equivalent axial positions in the first transmission system and the second transmission system, respectively.

In any of the aspects or combinations of the aspects, the first transmission system may include a first set of bearings and the second transmission system may include a second set of bearings; and the first and second sets of bearings have an equivalent construction.

In any of the aspects or combinations of the aspects, the first and second sets of bearings may have equivalent axial positions in the first and second transmission systems, respectively.

In any of the aspects or combinations of the aspects, the produce line may further include further a first housing section at least partially enclosing at least a portion of the first set of gears and the second set of gears; and a second housing section at least partially enclosing at least a portion of the third set of gears and the fourth set of gears; wherein the first housing section and the second housing section have an equivalent size and shape.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other powertrain hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the powertrain control system or transmission control system or vehicle control system, that may use different communication channels to exchange data and messages to provide an higher level of integration and interaction of prime mover, transmission, electric motor and inverter, where the described actions are carried out by executing the instructions in a system including the various powertrain hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to hybrid vehicles with various engine types such as V-4, V-6, I-4, I-6, V-8, V-10, V-12, V-16, W16, opposed 4, and other suitable types of engines. The transmission housing (e.g., front housing) may be bespoke for different types of engines and also may be designed for front engine applications to be coupled with a torque tube, for example.

As used herein, the terms "approximately" and "substantially" may be construed to mean plus or minus five percent of a value or range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hybrid transmission system, comprising:
a multi-speed gearbox including:
  a first primary shaft with a first set of gears positioned thereon and selectively coupled to an internal combustion engine (ICE) at a first end;
  a second primary shaft with a second set of gears positioned thereon;
  a secondary shaft with a third set of gears that mesh with the first set of gear and the second set of gears;
  an electric drive interface gear idly mounted, free to spin, on the second primary shaft, positioned between two gears in the second set of gears, and configured to receive mechanical power from an electric machine;
  a gear clutch coupled to the secondary shaft and designed to selectively engage a gear that is idly mounted to the secondary shaft and meshes with the electric drive interface gear; and
  an output shaft that includes:
    a first output shaft gear which is fixedly coupled thereto meshes with a gear on a secondary shaft; and
    a second output shaft gear which meshes with a bevel gear in a differential that is positioned perpendicular to the electric machine.

2. The hybrid transmission system of claim 1, further comprising:

an electric drive clutch designed to operate in:

an engaged position where mechanical power is transferred from the electric machine to a gear in the second set of gears via the electric drive interface gear; and a disengaged position where mechanical power is transferred from the electric machine to a gear in a third set of gears via the electric drive interface gear.

3. The hybrid transmission system of claim 2, wherein the electric drive clutch and a gear clutch are arranged in a similar axial position along the second primary shaft and the secondary shaft, respectively and wherein the gear clutch is coupled to the secondary shaft and selectively coupled to a gear in the third set of gears.

4. The hybrid transmission system of claim 2, wherein the electric drive clutch is a synchronizer, a dog clutch, or a sliding sleeve clutch.

5. The hybrid transmission system of claim 1, further comprising a dual-clutch assembly designed to selectively couple the ICE to the first primary shaft and the second primary shaft.

6. The hybrid transmission system of claim 1, wherein the electric drive interface gear is included in a dual gear unit with a second gear that meshes with a gear in a third set of gears.

7. The hybrid transmission system of claim 1, further comprising a mechanical reverse assembly coupled to the secondary shaft, wherein the mechanical reverse assembly comprises:

a reverse clutch and a reverse gear set configured to selectively rotationally couple the reverse gear set to the first primary shaft and the secondary shaft.

8. The hybrid transmission system of claim 1, further comprising a park lock assembly coupled to the output shaft that is coupled to the differential.

9. The hybrid transmission system of claim 1, wherein the multi-speed gearbox includes four or more operating gear ratios.

10. The hybrid transmission system of claim 1, wherein the hybrid transmission system is a transaxle.

\* \* \* \* \*